US009519775B2

(12) United States Patent
Sridhara et al.

(10) Patent No.: US 9,519,775 B2
(45) Date of Patent: Dec. 13, 2016

(54) PRE-IDENTIFYING PROBABLE MALICIOUS BEHAVIOR BASED ON CONFIGURATION PATHWAYS

(71) Applicant: QUALCOMM Incorporated, San Diego, CA (US)

(72) Inventors: Vinay Sridhara, Santa Clara, CA (US); Salyajit Prabhakar Patne, San Diego, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/044,937

(22) Filed: Oct. 3, 2013

(65) Prior Publication Data

US 2015/0101047 A1    Apr. 9, 2015

(51) Int. Cl.
*G06F 12/14* (2006.01)
*G06F 7/04* (2006.01)
(Continued)

(52) U.S. Cl.
CPC ............ *G06F 21/55* (2013.01); *G06F 21/577* (2013.01); *H04L 63/145* (2013.01);
(Continued)

(58) Field of Classification Search
CPC .... G06F 21/577; G06F 21/57; G06F 9/44505; H04L 63/1433; H04L 63/1441
(Continued)

(56) References Cited

U.S. PATENT DOCUMENTS 7,024,548 B1 * 4/2006 O'Toole, Jr. ........ H04L 41/0813
709/220
7,028,338 B1 * 4/2006 Norris et al. ................... 726/23
(Continued)

FOREIGN PATENT DOCUMENTS

| EP | 1619572 A1 | 1/2006 |
| WO | 2007007326 A2 | 1/2007 |
| WO | 2013142228 A1 | 9/2013 |

OTHER PUBLICATIONS

International Search Report and Written Opinion—PCT/US2014/056666—ISA/EPO—Dec. 12, 2012.
(Continued)

*Primary Examiner* — Aravind Moorthy
(74) *Attorney, Agent, or Firm* — The Marbury Law Group, PLLC

(57) ABSTRACT

The various aspects include systems and methods for enabling mobile computing devices to recognize when they are at risk of experiencing malicious behavior in the near future given a current configuration. Thus, the various aspects enable mobile computing devices to anticipate malicious behaviors before a malicious behavior begins rather than after the malicious behavior has begun. In the various aspects, a network server may receive behavior vector information from multiple mobile computing devices and apply pattern recognition techniques to the received behavior vector information to identify malicious configurations and pathway configurations that may lead to identified malicious configurations. The network server may inform mobile computing devices of identified malicious configurations and the corresponding pathway configurations, thereby enabling mobile computing devices to anticipate and
(Continued)

prevent malicious behavior from beginning by recognizing when they have entered a pathway configuration leading to malicious behavior.

20 Claims, 14 Drawing Sheets

(51) Int. Cl.
| | | |
|---|---|---|
| *G08B 29/00* | (2006.01) | |
| *G06F 15/177* | (2006.01) | |
| *G06F 11/30* | (2006.01) | |
| *G06F 21/55* | (2013.01) | |
| *H04W 12/12* | (2009.01) | |
| *G06F 21/57* | (2013.01) | |
| *H04L 29/06* | (2006.01) | |
| *G06F 9/445* | (2006.01) | |

(52) U.S. Cl.
CPC ......... *H04L 63/1433* (2013.01); *H04W 12/12* (2013.01); *G06F 9/44505* (2013.01); *G06F 21/57* (2013.01); *H04L 63/1408* (2013.01); *H04L 63/1441* (2013.01)

(58) Field of Classification Search
USPC ........................... 726/25, 26, 34; 713/1, 187
See application file for complete search history.

(56) References Cited

U.S. PATENT DOCUMENTS

| 7,257,523 | B1* | 8/2007 | Nixon | G05B 17/02 |
| | | | | 700/2 |
| 7,370,360 | B2 | 5/2008 | Van Der Made | |
| 7,774,843 | B1 | 8/2010 | Prakash | |
| 7,827,612 | B2 | 11/2010 | Saito | |
| 8,201,246 | B1 | 6/2012 | Wu et al. | |
| 8,365,286 | B2 | 1/2013 | Poston | |
| 8,375,450 | B1 | 2/2013 | Oliver et al. | |
| 8,464,345 | B2 | 6/2013 | Satish et al. | |
| 2005/0015667 | A1* | 1/2005 | Aaron | G06F 11/0709 |
| | | | | 714/25 |
| 2005/0038827 | A1 | 2/2005 | Hooks | |
| 2006/0025962 | A1* | 2/2006 | Ma et al. | 702/182 |
| 2006/0075494 | A1 | 4/2006 | Bertman et al. | |
| 2006/0278694 | A1 | 12/2006 | Jha et al. | |
| 2008/0086773 | A1* | 4/2008 | Tuvell et al. | 726/23 |
| 2009/0271863 | A1* | 10/2009 | Govindavajhala et al. | 726/23 |
| 2009/0320136 | A1 | 12/2009 | Lambert et al. | |
| 2010/0077481 | A1 | 3/2010 | Polyakov et al. | |
| 2011/0214161 | A1* | 9/2011 | Stolfo | H04L 63/102 |
| | | | | 726/4 |
| 2012/0137369 | A1* | 5/2012 | Shin | G06F 21/577 |
| | | | | 726/25 |
| 2012/0159629 | A1 | 6/2012 | Lee et al. | |
| 2012/0210423 | A1 | 8/2012 | Friedrichs et al. | |
| 2013/0042115 | A1* | 2/2013 | Sweet et al. | 713/176 |
| 2013/0091570 | A1 | 4/2013 | McCorkendale et al. | |
| 2013/0097660 | A1* | 4/2013 | Das | H04L 63/10 |
| | | | | 726/1 |
| 2013/0097706 | A1 | 4/2013 | Titonis et al. | |
| 2013/0311385 | A1* | 11/2013 | Foreman | G06Q 10/0639 |
| | | | | 705/317 |
| 2013/0340081 | A1* | 12/2013 | Sakthikumar | G06F 21/56 |
| | | | | 726/24 |
| 2013/0347094 | A1* | 12/2013 | Bettini | H04L 63/0245 |
| | | | | 726/11 |
| 2014/0201732 | A1* | 7/2014 | Haag | G06F 9/45533 |
| | | | | 718/1 |
| 2014/0259167 | A1* | 9/2014 | Babu et al. | 726/23 |
| 2014/0325616 | A1* | 10/2014 | Dolph et al. | 726/5 |
| 2015/0101048 | A1 | 4/2015 | Sridhara et al. | |
| 2016/0063243 | A1 | 3/2016 | Sridhara et al. | |

OTHER PUBLICATIONS

Jemal R., "Chapter 2 : The 8086 Processor Architecture", Mar. 4, 2011, pp. 1-28, XP055155473, Retrieved from the Internet: URL:http://faculty.ksu.edu.sa/djemal/EE353/EE353Chap2-1.0.pdf [retrieved on Nov. 27, 2014] p. 8-p. 11.

Kayaalp., et al., "Scrap: Architecture for Signature-Based Protection from Code Reuse Attacks", Feb. 2013; Internet URL: ieeexplore. ieee.org/xpls/abs_all.jsp?arnumber=6522324&tag=1, pp. 1-12 as printed.

Shi., et al., "Augmenting Branch Predictor to Secure Program Execution", 2007, Retrieved from the Internet URL: ieeexplore. ieee.org/xpls/icp.jsp?arnumber=4272951, pp. 1-10 as printed.

* cited by examiner

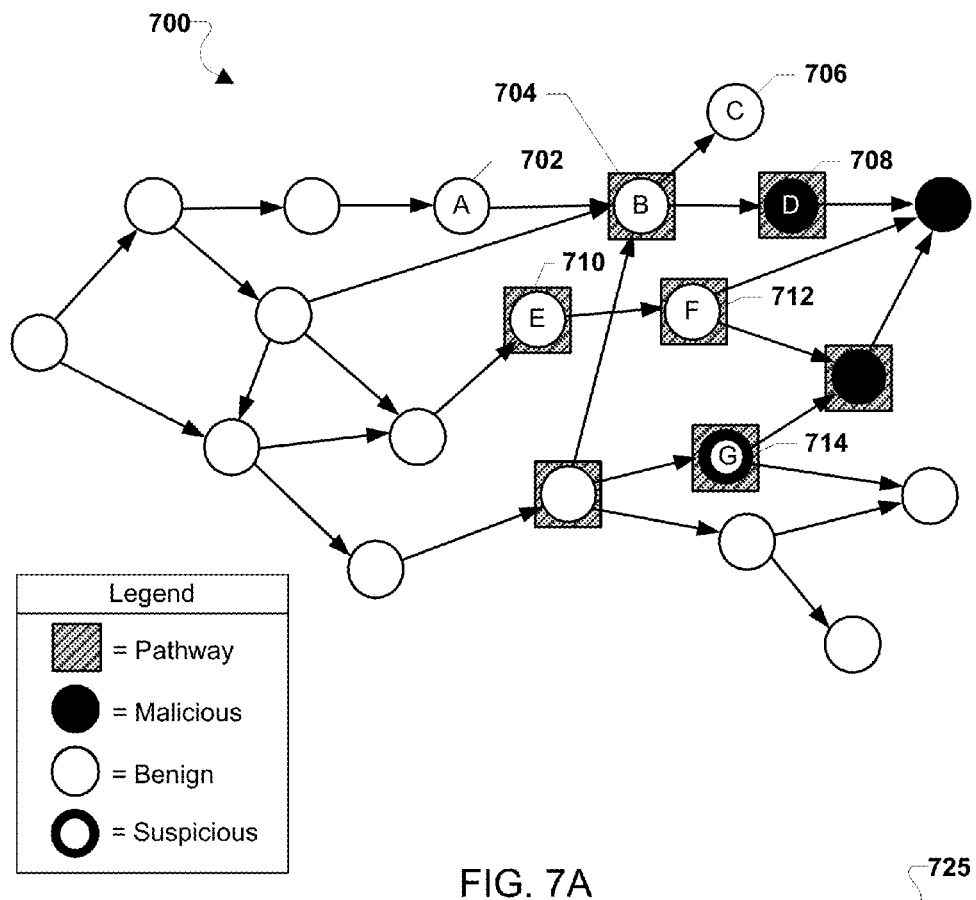

| Current Configuration Classification | Potential Future Configurations Classifications | Substantial Likelihood of Malicious Behavior in the Near Future? |
|---|---|---|
| Benign | No malicious configurations | No |
| Suspicious | Any configuration | Yes |
| Benign | ≥ 1 malicious configuration and ≥ 1 non-malicious configuration | Yes |
| Malicious | Any configuration | Yes |
| Benign | All malicious configurations | Yes |
| Suspicious | All malicious configurations | Yes |

US 9,519,775 B2

PRE-IDENTIFYING PROBABLE MALICIOUS BEHAVIOR BASED ON CONFIGURATION PATHWAYS

RELATED APPLICATIONS

This application is related to U.S. patent application Ser. No. 14/044,956 entitled "Malware Detection and Prevention by Monitoring and Modifying a Hardware Pipeline", which is filed contemporaneously with this application and is hereby incorporated by reference in its entirety.

BACKGROUND

Generally, the performance and power efficiency of a mobile computing device degrade over time. Anti-virus companies (e.g., McAfee, Symantec, etc.) now sell mobile anti-virus, firewall, and encryption products that aim to slow this degradation. However, many of these solutions rely on the periodic execution of a computationally-intensive scanning engine on the mobile computing device, which may consume many of the mobile computing device's processing and battery resources, slow or render the mobile computing device useless for extended periods of time, and/or otherwise degrade the user experience. In addition, these solutions are typically limited to detecting known viruses and malware, and do not address the multiple complex factors and/or the interactions that often combine to contribute to a mobile computing device's degradation over time (e.g., when the performance degradation is not caused by viruses or malware). For these and other reasons, existing anti-virus, firewall, and encryption products do not provide adequate solutions for identifying the numerous factors that may contribute to a mobile computing device's degradation over time or for preventing mobile computing device degradation.

SUMMARY

The various aspects present a system for anticipating malicious behavior on a mobile computing device before the malicious behavior begins, rather than after the malicious behavior has occurred or begun. In the various aspects, a network server may receive behavior vector information from multiple mobile computing devices and may implement various pattern recognition techniques on the received behavior vector information to identify malicious configurations and pathway configurations leading to those malicious configurations. The network server may inform mobile computing devices of the identified malicious configurations and the corresponding pathway configurations, thereby enabling the mobile computing device to anticipate and prevent malicious behavior in real time by recognizing when it has entered or is about to enter a pathway configuration leading to malicious behavior.

In an aspect, the network server may receive configuration information from a plurality of mobile computing devices after the mobile computing devices have detected on-going malicious activity. The configuration information may indicate the configurations or states of the mobile computing devices at the time the malicious behavior was detected, as well as a history of the mobile computing devices' configurations and states leading up to the malicious behavior. The network server may analyze the assembled mobile computing devices' configuration information to determine configurations that indicate malicious behavior and configuration patterns and pathways between configurations that lead to malicious configurations (i.e., pathway configurations). The server may assemble the identified pathway configurations into a database or other suitable data structure, and may send malicious and pathway configuration databases to the mobile computing devices that provide a database or data structure of the identified malicious configurations and pathway configurations that the mobile computing devices can use in analyzing their own behaviors and configurations.

In an aspect, after receiving a malicious and pathway configuration database, a mobile computing device may determine its current configuration and compare its current configuration to the configurations included in the malicious and pathway configuration database to determine whether its current configuration is leading to malicious behavior (i.e., a pathway configuration). When the mobile computing device's current configuration is a pathway configuration, the mobile computing device may implement various preventative measures to head off or prevent the malicious behavior from beginning.

In another aspect, the network server may also calculate the probability that a pathway configuration leads to malicious behavior. In such an aspect, the network server may send the probabilities that particular pathway configurations lead to malicious configurations with the configuration database or data structure, and the mobile computing device may reference the received probabilities in addition to the pathway configurations in the configuration database or data structure to determine whether its current configuration is likely to lead to a malicious configuration.

In another aspect, the network server may identify particular instructions that, if performed, would turn a pathway configuration into a malicious configuration. The network server may include such identified instructions in the configuration database or data structure, and a mobile computing device may reference the configuration database or data structure to watch out for and prevent execution of identified instructions when the device's current configuration is a pathway configuration.

The various aspects include a method implemented by a network server for identifying mobile computing device configurations leading to malicious behavior by receiving configuration information and configuration histories from a plurality of mobile computing devices, analyzing the configuration information to identify malicious configurations, identifying pathway configurations based on the identified malicious configurations and the configuration histories, generating a malicious and pathway configuration database that includes the identified malicious configurations and the identified pathway configurations, and sending the malicious and pathway configuration database to a plurality of mobile computing devices. In an aspect, the method may also include calculating a probability of transitioning to a malicious configuration for each of the identified pathway configurations and including the calculated probabilities in the malicious and pathway configuration database. In another aspect, the method may also include identifying malicious pathway instructions that when executed while in an identified pathway configuration lead to an identified malicious configuration and including in the malicious and pathway configuration database a list of identified instructions that lead to the identified malicious configurations when executed.

Further aspects include a method implemented by a mobile computing device for predicting probable malicious behavior on a mobile computing device before it occurs by receiving a malicious and pathway configuration database, determining a current configuration, determining whether the current configuration is leading to a malicious configuration based on the malicious and pathway configuration database, and implementing preventative measures to avoid the malicious configuration in response to determining that the current configuration is leading to a malicious configuration. In an aspect, implementing preventative measures to avoid the malicious configuration may include identifying a process associated with the current configuration and slowing down execution of the process.

In another aspect, the method may also include examining other behaviors occurring on the mobile computing device, determining whether there is a substantial likelihood that the current configuration is leading to a malicious configuration based on the examination of the other behaviors, and implementing preventative measures for the process in response to determining that there is a substantial likelihood that the current configuration is leading to a malicious configuration. In yet another aspect, the method may also include determining a classification of the current configuration, determining a classification of a potential future configuration, determining a likelihood of the current configuration leading to a malicious configuration based on the classification of the current configuration and the classification of the potential future configuration, determining whether the likelihood is substantial, and implementing preventative measures for the process in response to determining that the likelihood is substantial. In another aspect, the method may also include determining a probability of the current configuration leading to a malicious configuration based on the current configuration and configuration transition probabilities wherein the configuration transition probabilities are included in the malicious and pathway configuration database, determining whether the probability of the current configuration leading to a malicious configuration exceeds a risk threshold, and implementing preventative measures for the process in response to determining that the probability of the current configuration leading to a malicious configuration exceeds the risk threshold.

Further aspects include a network server that may include a server processor configured with server-executable instructions to perform operations that include receiving configuration information and configuration histories from a plurality of mobile computing devices, analyzing the configuration information to identify malicious configurations, identifying pathway configurations based on the identified malicious configurations and the configuration histories, generating a malicious and pathway configuration database that includes the identified malicious configurations and the identified pathway configurations, and sending the malicious and pathway configuration database to a plurality of mobile computing devices. In an aspect, the server processor may be configured with server executable instructions to perform operations that include calculating a probability of transitioning to a malicious configuration for each of the identified pathway configurations and including the calculated probabilities in the malicious and pathway configuration database. In another aspect, the server processor may be configured with server executable instructions to perform operations that include identifying malicious pathway instructions that when executed while in an identified pathway configuration lead to an identified malicious configuration and including in the malicious and pathway configuration database a list of identified instructions that lead to the identified malicious configurations when executed.

Further aspects include a mobile computing device that may include a memory, a transceiver, and a processor coupled to the memory and the transceiver, wherein the processor may be configured with processor-executable instructions to perform operations that include receiving a malicious and pathway configuration database, determining a current configuration, determining whether the current configuration is leading to a malicious configuration based on the malicious and pathway configuration database, and implementing preventative measures to avoid the malicious configuration in response to determining that the current configuration is leading to a malicious configuration. In another aspect, the processor may be configured with processor-executable instructions to perform operations such that implementing preventative measures to avoid the malicious configuration includes identifying a process associated with the current configuration and slowing down execution of the process.

In an aspect, the processor may be configured with processor-executable instructions to perform operations further that include examining other behaviors occurring on the mobile computing device, determining whether there is a substantial likelihood that the current configuration is leading to a malicious configuration based on the examination of the other behaviors, and implementing preventative measures for the process in response to determining that there is a substantial likelihood that the current configuration is leading to a malicious configuration. In another aspect, the processor may be configured with processor-executable instructions to perform operations that also include determining a classification of the current configuration, determining a classification of a potential future configuration, determining a likelihood of the current configuration leading to a malicious configuration based on the classification of the current configuration and the classification of the potential future configuration, determining whether the likelihood is substantial, and implementing preventative measures for the process in response to determining that the likelihood is substantial. In another aspect, the processor may be configured with processor-executable instructions to perform operations that also include determining a probability of the current configuration leading to a malicious configuration based on the current configuration and configuration transition probabilities wherein the configuration transition probabilities are included in the malicious and pathway configuration database, determining whether the probability of the current configuration leading to a malicious configuration exceeds a risk threshold, and implementing preventative measures for the process in response to determining that the probability of the current configuration leading to a malicious configuration exceeds the risk threshold.

Further aspects include a server including means for receiving configuration information and configuration histories from a plurality of mobile computing devices, means for analyzing the configuration information to identify malicious configurations, means for identifying pathway configurations based on the identified malicious configurations and the configuration histories, means for generating a malicious and pathway configuration database that includes the identified malicious configurations and the identified pathway configurations, and means for sending the malicious and pathway configuration database to a plurality of mobile computing devices. In an aspect, the server may also include means for calculating a probability of transitioning to a malicious configuration for each of the identified pathway configurations and means for including the calculated probabilities in the malicious and pathway configuration database. In another embodiment, the server may also include means for identifying malicious pathway instructions that when executed while in an identified pathway configuration lead to an identified malicious configuration and means for including in the malicious and pathway configuration database a list of identified instructions that lead to the identified malicious configurations when executed.

Further aspects include a mobile computing device including means for receiving a malicious and pathway configuration database, means for determining a current configuration, means for determining whether the current configuration is leading to a malicious configuration based on the malicious and pathway configuration database, and means for implementing preventative measures to avoid the malicious configuration in response to determining that the current configuration is leading to a malicious configuration. In an aspect, means for implementing preventative measures to avoid the malicious configuration may include means for identifying a process associated with the current configuration and means for slowing down execution of the process.

In an aspect, the mobile computing device may include means for examining other behaviors occurring on the mobile computing device, means for determining whether there is a substantial likelihood that the current configuration is leading to a malicious configuration based on the examination of the other behaviors, and means for implementing preventative measures for the process in response to determining that there is a substantial likelihood that the current configuration is leading to a malicious configuration. In another aspect, the mobile computing device may also include means for determining a classification of the current configuration, means for determining a classification of a potential future configuration, means for determining a likelihood of the current configuration leading to a malicious configuration based on the classification of the current configuration and the classification of the potential future configuration, means for determining whether the likelihood is substantial, and means for implementing preventative measures for the process in response to determining that the likelihood is substantial. In another aspect, the mobile computing device may also include means for determining a probability of the current configuration leading to a malicious configuration based on the current configuration and configuration transition probabilities, wherein the configuration transition probabilities are included in the malicious and pathway configuration database, means for determining whether the probability of the current configuration leading to a malicious configuration exceeds a risk threshold, and means for implementing preventative measures for the process in response to determining that the probability of the current configuration leading to a malicious configuration exceeds the risk threshold.

In further aspects, a non-transitory server-readable storage medium may have stored thereon server-executable instructions configured to cause a server processor to perform operations that include receiving configuration information and configuration histories from a plurality of mobile computing devices, analyzing the configuration information to identify malicious configurations, identifying pathway configurations based on the identified malicious configurations and the configuration histories, generating a malicious and pathway configuration database that includes the identified malicious configurations and the identified pathway configurations, and sending the malicious and pathway configuration database to a plurality of mobile computing devices. In an aspect, the stored server-executable instructions may be configured to cause a server processor to perform operations that include calculating a probability of transitioning to a malicious configuration for each of the identified pathway configurations and including the calculated probabilities in the malicious and pathway configuration database. In another aspect, the stored server-executable instructions may be configured to cause a server processor to perform operations that include identifying malicious pathway instructions that when executed while in an identified pathway configuration lead to an identified malicious configuration and including in the malicious and pathway configuration database a list of identified instructions that lead to the identified malicious configurations when executed.

In further aspects, a non-transitory processor-readable storage medium may have stored thereon processor-executable instructions configured to cause a mobile computing device processor to perform operations that include receiving a malicious and pathway configuration database, determining a current configuration, determining whether the current configuration is leading to a malicious configuration based on the malicious and pathway configuration database, and implementing preventative measures to avoid the malicious configuration in response to determining that the current configuration is leading to a malicious configuration. In an aspect, the stored processor-executable instructions may be configured to cause a mobile computing device processor to perform operations such that implementing preventative measures to avoid the malicious configuration includes identifying a process associated with the current configuration and slowing down execution of the process.

In an aspect, the stored processor-executable instructions may be configured to cause a mobile computing device processor to perform operations that include examining other behaviors occurring on the mobile computing device, determining whether there is a substantial likelihood that the current configuration is leading to a malicious configuration based on the examination of the other behaviors, and implementing preventative measures for the process in response to determining that there is a substantial likelihood that the current configuration is leading to a malicious configuration. In another aspect, the stored processor-executable instructions may be configured to cause a mobile computing device processor to perform operations that include determining a classification of the current configuration, determining a classification of a potential future configuration, determining a likelihood of the current configuration leading to a malicious configuration based on the classification of the current configuration and the classification of the potential future configuration, determining whether the likelihood is substantial, and implementing preventative measures for the process in response to determining that the likelihood is substantial. In another aspect, the stored processor-executable instructions may be configured to cause a mobile computing device processor to perform operations that include determining a probability of the current configuration leading to a malicious configuration based on the current configuration and configuration transition probabilities wherein the configuration transition probabilities are included in the malicious and pathway configuration database, determining whether the probability of the current configuration leading to a malicious configuration exceeds a risk threshold, and implementing preventative measures for the process in response to determining that the probability of the current configuration leading to a malicious configuration exceeds the risk threshold.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 7A is a finite state machine diagram illustrating a finite state machine analysis for predicting the likelihood of malicious behavior in the near future.

FIG. 7B is an embodiment look-up table used when predicting the likelihood of malicious behavior in the near future.

DETAILED DESCRIPTION

Figure 1:
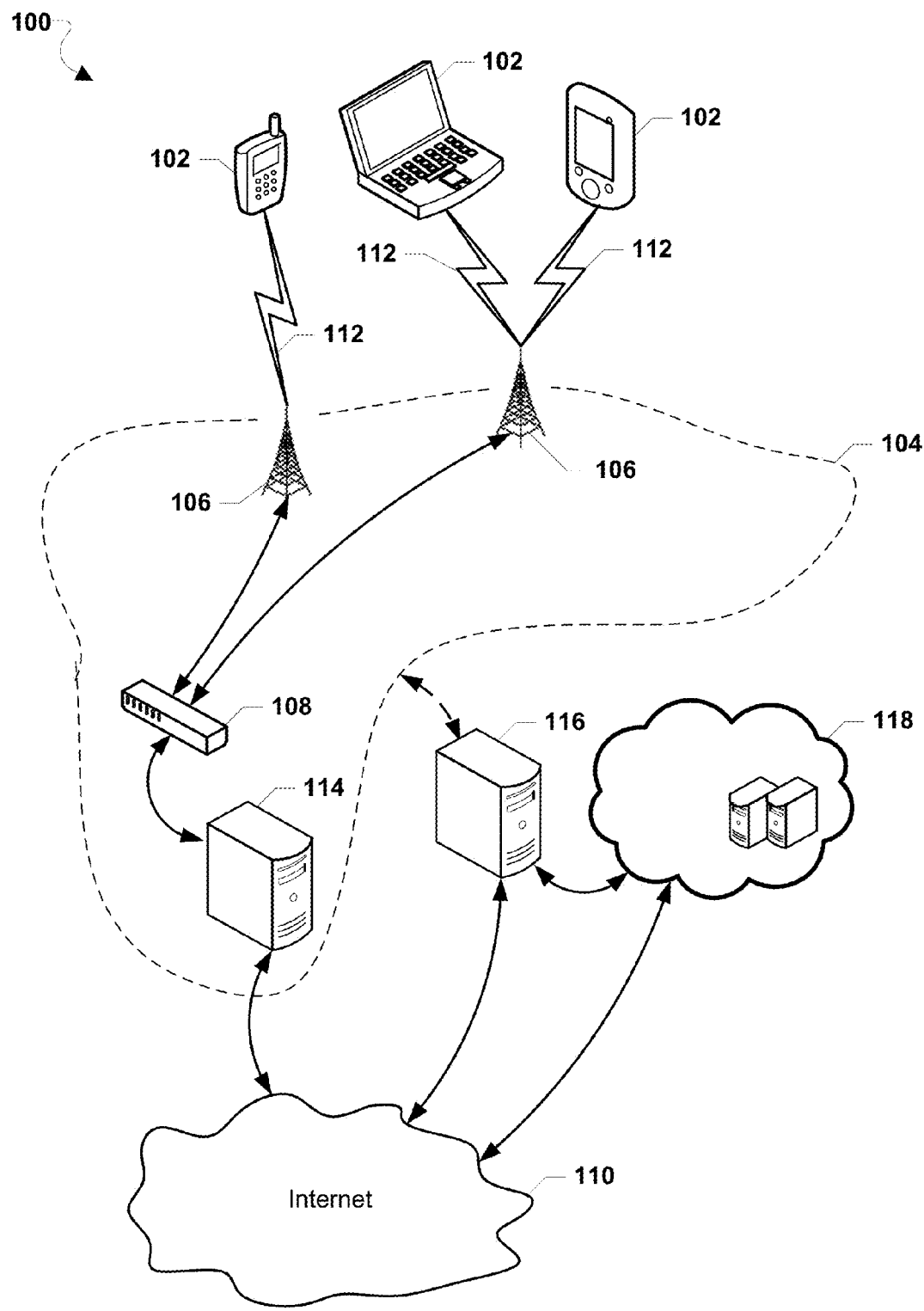
FIG. 1 is a communication system block diagram illustrating network components of an example communication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "mobile computing device" as used herein refers to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources, the aspects are generally useful in any electronic device that includes a processor and executes application programs.

The term "malicious behavior" is used herein to refer to a wide variety of undesirable mobile computing device operations and characteristics, such as longer processing times, lower battery life, loss of private data, malicious economic activity (e.g., sending unauthorized premium SMS message), operations relating to commandeering the mobile computing device or utilizing the phone for spying or botnet activities, etc.

The term "malicious configuration" is used herein to refer to a configuration of a mobile computing device, application, process, etc. that exhibits or performs malicious behavior. The term "suspicious configuration" is used herein to refer to a configuration in which there is some evidence of malicious behavior but more information is needed before a definitive conclusion can be reached regarding malicious behavior. The term "benign configuration" is used herein to refer to a configuration that is neither a malicious configuration nor a suspicious configuration.

The term "pathway configuration" is used herein to refer to a vector or pathway that a network server has recognized as an intermediate configuration leading to a malicious configuration. In various aspects, a pathway configuration may be any configuration (e.g., a benign configuration, a suspicious configuration, or a malicious configuration) that leads to a malicious configuration.

There are a variety of factors that may contribute to the degradation in performance and power utilization levels of a mobile computing device over time, including poorly designed software applications, malware, viruses, fragmented memory, background processes, and other malicious behavior. However, due to the complexity of modern mobile computing devices, it is increasingly difficult for users, operating systems, and/or application programs (e.g., antivirus software, etc.) to accurately and efficiently identify the sources of such problems and/or to provide adequate remedies to identified problems.

Various solutions currently exist for detecting malicious behavior on a computing device. Many solutions have traditionally relied on a signature database of malicious code/malware built on a server. These solutions require referencing a signature database to detect whether code is malicious based on the identity (i.e., signature) of the code, such as the name of a file, the name of a function call, the structure of a particular code segment, and even the signature of each byte of code. However, these solutions are inadequate to detect malicious behavior that may be undetectable until the code is executed and are increasingly ineffective as a result of new techniques of forging signatures. In contrast, the various aspects described below enable a mobile computing device to detect malicious behavior during normal operations (i.e., in real time) and prevent such malicious behavior from occurring in the future, regardless of any particular identity or signature.

Other solutions use behavioral models to differentiate between malicious and benign process/programs on computing devices. However, these solutions are currently limited to evaluating the current/on-going behavior of individual application programs or processes. Thus, these solutions are limited to resolving problems only after they have already begun. In contrast, the various aspects described below enable a mobile computing device to anticipate and prevent future malicious behavior in real time before such malicious behavior occurs.

Additionally, some solutions look for signs of malicious behavior in code, files, scripts, etc. before they are executed by initiating preemptive scans. For instance, a solution may require a file downloaded from a location on the Internet to be scanned for viruses before the file can be executed locally. Other solutions attempt to discover malicious behavior by executing programs or processes in a safe environment (e.g., a virtual machine) and attempting to discover whether the programs or processes behave maliciously when run. However, these solutions require an investment of considerable computation resources because each suspected programs, files, processes, etc. must be determined to be benign before being allowed to execute as part of normal operations.

In contrast to conventional approaches, the various aspects described below enable a mobile computing device to detect and prevent malicious behavior in real time, thereby avoiding the considerable startup costs of contemporary methods and allowing applications and processes to execute normally until the mobile computing device detects a credible risk of future malicious behavior. In overview, the various aspects address the limitations of contemporary solutions—such as those described above—by providing mobile devices with a database of pathway configurations that enable mobile computing devices to determine whether they are at risk of experiencing malicious behavior in the near future given the mobile computing device's current state or condition of operation, as well as operations scheduled for execution. Thus, the various aspects present a system for anticipating malicious behavior on a mobile computing device before the malicious behavior begins, rather than after the malicious behavior has occurred or begun. In the various aspects, a network server may receive behavior vector information from multiple mobile computing devices and may implement various pattern recognition techniques (including finite state machine analysis) on the received behavior vector information to identify malicious configurations and pathway configurations leading to those malicious configurations. The network server may inform mobile computing devices of the identified malicious configurations and the corresponding pathway configurations (i.e., configurations that exit not long before the identified malicious configurations), thereby enabling the mobile computing device to anticipate and prevent malicious behavior in real time by recognizing when it has entered or is about to enter a pathway configuration leading to malicious behavior.

In an aspect, the network server may receive configuration information (e.g., states in a finite state machine or vector values in a behavior vector) from a plurality of mobile computing devices after the mobile computing devices have detected on-going malicious activity. The configuration information may indicate the configurations or states of the mobile computing devices at the time the malicious behavior was detected, as well as a history of the mobile computing devices' configurations and states leading up to the malicious behavior. The network server may analyze the assembled mobile computing devices' configuration information (e.g., by utilizing pattern recognition or finite state machine analysis) to determine configurations that indicate malicious behavior. The network server may utilize the mobile computing devices' configuration histories to "walk back" from the malicious configurations to recognize configuration patterns and pathways between configurations that lead to malicious configurations (i.e., pathway configurations). The server may assemble the identified pathway configurations into a database or other suitable data structure, and may send malicious and pathway configuration databases to the mobile computing devices that provide a database or data structure of the identified malicious configurations and pathway configurations that the mobile computing devices can use in analyzing their own behaviors and configurations.

In another aspect, after receiving a malicious and pathway configuration database, a mobile computing device may determine its current configuration and compare its current configuration to the configurations included in the malicious and pathway configuration database to determine whether its current configuration is leading to malicious behavior. In other words, the mobile computing device may utilize the configuration database or data structure received from the network server to determine whether its current configuration is a pathway configuration. When the mobile computing device's current configuration is a pathway configuration, the mobile computing device may implement various preventative measures to head off or prevent the malicious behavior from beginning.

In another aspect, the network server may also calculate the probability that a pathway configuration leads to malicious behavior. In such an aspect, the network server may send the probabilities that particular pathway configurations lead to malicious configurations with the configuration database or data structure, and the mobile computing device may reference the received probabilities in addition to the pathway configurations in the configuration database or data structure to determine whether its current configuration is likely to lead to a malicious configuration.

In another aspect, the network server may identify particular instructions that, if performed, would turn a pathway configuration into a malicious configuration. The network server may include such identified instructions in the configuration database or data structure, and a mobile computing device may reference the configuration database or data structure to watch out for and prevent execution of identified instructions when the device's current configuration is a pathway configuration.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile computing devices 102 (e.g., cell phones, laptops, tablets, etc.) and other network destinations, such as via telephone land lines (e.g., a POTS network, not shown) and the Internet 110. Communications between the mobile computing devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 118 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile computing devices 102 may be achieved through the telephone network 104, the internet 110, private network (not illustrated), or any combination thereof.

The mobile computing devices 102 may collect behavioral, state, classification, modeling, success rate, and/or statistical information in the mobile computing device 102, and send the collected information to the network server 116 (e.g., via the telephone network 104) for analysis. In an aspect, the mobile computing devices 102 may send their current configuration information (e.g., their behavioral vectors describing their current state) after experiencing malicious behavior. The mobile computing device 102 may also send their configuration histories to the network server 116. The configuration histories may include a history of configuration changes that occurred leading up to the discovery of malicious behavior and, optionally, the instructions that caused those configuration changes. The network server 116 may use information received from the mobile computing devices 102 to determine a list of malicious configurations and configurations leading up to the malicious configurations (i.e., pathway configurations) as further described below with reference to FIG. 4.

In another aspect, the network server 116 may send malicious and pathway configuration databases to the mobile computing devices 102, which may receive and use the malicious and pathway configuration databases to predict future malicious behavior before it occurs. The network server 116 may send subsequent malicious and pathway configuration databases to the mobile computing devices 102 to replace, update, create and/or maintain mobile computing device data/behavior models.

Figure 2:
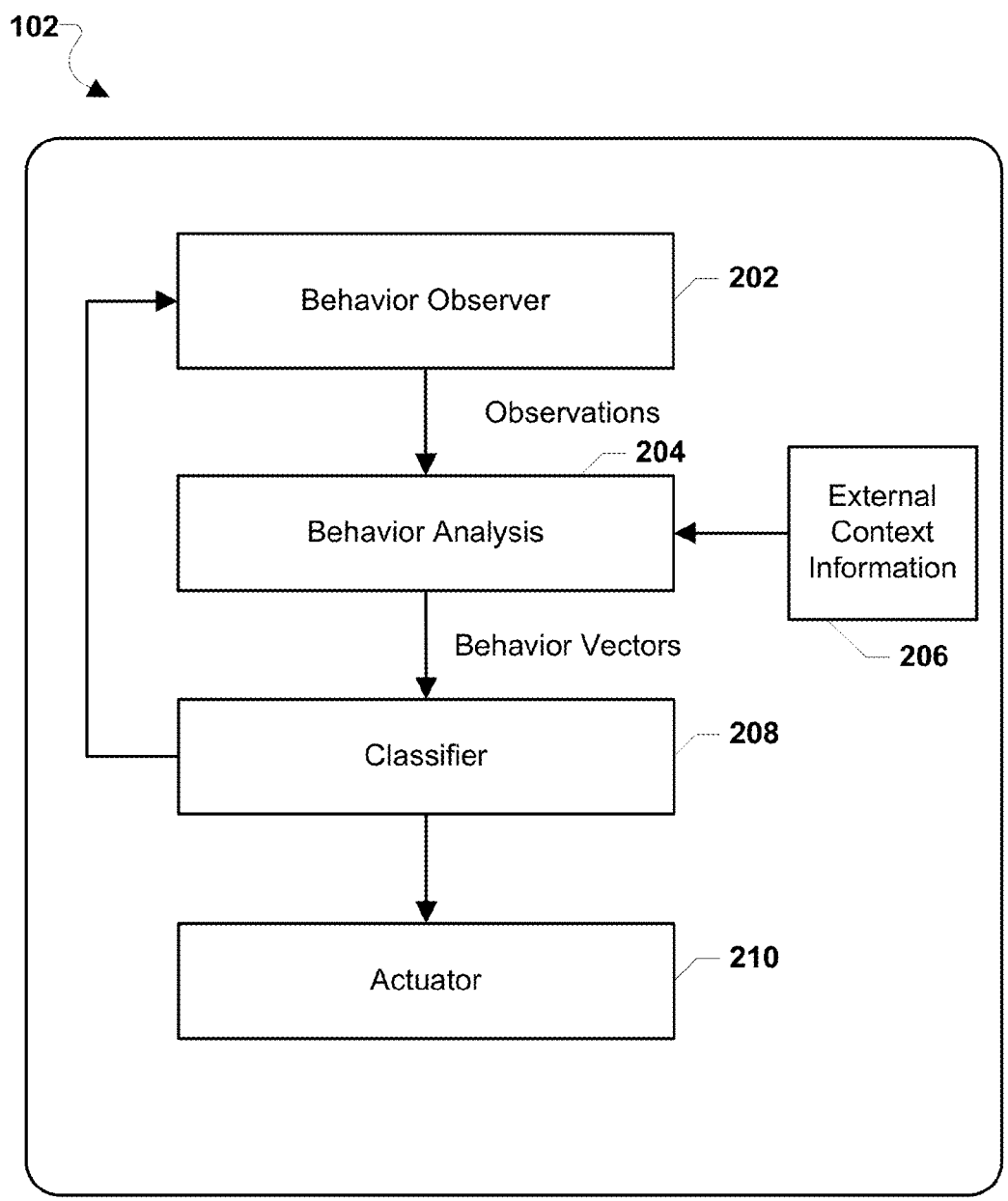
FIG. 2 is a block diagram illustrating example logical components and information flows in an aspect mobile computing device configured to determine whether a particular mobile computing device behavior, software application, or process is leading to malicious behavior.

FIG. 2 illustrates example logical components and information flows in an aspect mobile computing device 102 configured to determine whether a particular mobile computing device behavior, software application, or process is malicious, suspicious, or benign. In the example illustrated in FIG. 2, the mobile computing device 102 may include a behavior observer unit 202, a behavior analyzer unit 204, an external context information unit 206, a classifier unit 208, and an actuator unit 210. In an aspect, the classifier unit 208 may be implemented as part of the behavior analyzer unit 204. In an aspect, the behavior analyzer unit 204 may be configured to generate one or more classifier units 208, each of which may include one or more classifiers.

Each of the units 202-210 may be implemented in software, hardware, or any combination thereof. In various aspects, the units 202-210 may be implemented within parts of the operating system (e.g., within the kernel, in the kernel space, in the user space, etc.), within separate programs or applications, in specialized hardware buffers or processors, or any combination thereof. In an aspect, one or more of the units 202-210 may be implemented as software instructions executing on one or more processors of the mobile computing device 102.

The behavior observer unit 202 may be configured to instrument or coordinate application programming interfaces (APIs) at various levels/modules of the mobile computing device, and monitor/observe mobile computing device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer unit 204.

The behavior observer unit 202 may monitor/observe mobile computing device operations and events by collecting information pertaining to library API calls in an application framework or run-time libraries, system call APIs, file-system and networking sub-system operations, device (including sensor devices) state changes, and other similar events. The behavior observer unit 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer unit 202 may also monitor data network activity, which may include types of connections, protocols, port numbers, server/client that the device is connected to, the number of connections, volume or frequency of communications, etc. The behavior observer unit 202 may monitor phone network activity, which may include monitoring the type and number of calls or messages (e.g., SMS, etc.) sent out, received, or intercepted (e.g., the number of premium calls placed).

The behavior observer unit 202 may also monitor the system resource usage, which may include monitoring the number of forks, memory access operations, number of files open, etc. The behavior observer unit 202 may monitor the state of the mobile computing device, which may include monitoring various factors, such as whether the display is on or off, whether the device is locked or unlocked, the amount of battery remaining, the state of the camera, etc. The behavior observer unit 202 may also monitor inter-process communications (IPC) by, for example, monitoring intents to crucial services (browser, contracts provider, etc.), the degree of inter-process communications, pop-up windows, etc.

The behavior observer unit 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer unit 202 may also monitor/observe one or more hardware counters that denote the state or status of the mobile computing device and/or mobile computing device sub-systems. A hardware counter may include a special-purpose register of the processors/cores that is configured to store a count or state of hardware-related activities or events occurring in the mobile computing device.

The behavior observer unit 202 may also monitor/observe actions or operations of software applications, software downloads from an application download server (e.g., Apple® App Store server), mobile computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer unit 202 may monitor/observe transmissions or communications of the mobile computing device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer unit 202 may monitor/observe usage of and updates/changes to compass information, mobile computing device settings, battery life, gyroscope information, pressure sensors, magnet sensors, screen activity, etc. The behavior observer unit 202 may monitor/observe notifications communicated to and from a software application (AppNotifications), application updates, etc. The behavior observer unit 202 may monitor/observe conditions or events pertaining to a first software application requesting the downloading and/or install of a second software application. The behavior observer unit 202 may monitor/observe conditions or events pertaining to user verification, such as the entry of a password, etc.

The behavior observer unit 202 may also monitor/observe conditions or events at multiple levels of the mobile computing device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile computing device before establishing radio communication links or transmitting information, dual/multiple SIM cards, Internet radio, mobile phone tethering, offloading data for computations, device state communications, the use as a game controller or home controller, vehicle communications, mobile computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device. For example, the mobile computing device processor may be configured to determine whether the phone is in a holster (e.g., via a magnet sensor configured to sense a magnet within the holster) or in the user's pocket (e.g., via the amount of light detected by a camera or light sensor). Detecting that the mobile computing device is in a holster may be relevant to recognizing malicious behaviors, for example, because activities and functions related to active usage by a user (e.g., taking photographs or videos, sending messages, conducting a voice call, recording sounds, etc.) occurring while the mobile computing device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a USB power charging source, detecting that a keyboard or auxiliary device has been coupled to the mobile computing device, detecting that the mobile computing device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device, etc.

To reduce the number of factors monitored to a manageable level, in an aspect, the behavior observer unit 202 may perform coarse observations by monitoring/observing an initial set of behaviors or factors that are a small subset of all factors that could contribute to the mobile computing device's degradation. In an aspect, the behavior observer unit 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

The behavior analyzer unit 204 and/or classifier unit 208 may receive the observations from the behavior observer unit 202, compare the received information (i.e., observations) with contextual information received from the external context information unit 206, and identify subsystems, processes, and/or applications associated with the received observations that are contributing to (or are likely to contribute to) the device's degradation over time, or which may otherwise cause problems on the device (e.g., malicious behavior).

In an aspect, the behavior analyzer unit 204 and/or classifier unit 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer unit 204 may be configured to analyze information (e.g., in the form of observations) collected from various units (e.g., the behavior observer unit 202, external context information unit 206, etc.), learn the normal operational behaviors of the mobile computing device, and generate one or more behavior vectors based the results of the comparisons. The behavior analyzer unit 204 may send the generated behavior vectors to the classifier unit 208 for further analysis.

The classifier unit 208 may receive the behavior vectors and compare them to one or more behavior modules to determine whether a particular mobile computing device behavior, software application, or process is malicious, benign, or suspicious.

When the classifier unit 208 determines that a behavior, software application, or process is malicious, the classifier unit 208 may notify the actuator unit 210, which may perform various actions or operations to correct mobile computing device behaviors determined to be malicious or performance-degrading and/or perform operations to heal, cure, isolate, or otherwise fix the identified problem.

In further aspects, the behavior analyzer unit 204 and/or the classifier unit 208 may reference a malicious and pathway configuration database received from a network server (e.g., network server 116) to determine whether the current configuration of the mobile computing device 102 is a pathway configuration. In an aspect, the classifier unit 208 (or the behavior analyzer unit 204) may compare the mobile computing device's current configuration with one or more pathway configurations included in the malicious and pathway configuration database received from the network server to determine whether the current configuration of the mobile computing device 102 matches a pathway configuration included in the malicious and pathway configuration database. For example, the behavior analyzer unit 204 may generate a behavioral vector for a particular application currently running on the mobile computing device, and the classifier unit 208 may compare the application's behavioral vector with pathway configurations included in the malicious and pathway configuration database to determine whether the application's current configuration is leading to malicious behavior on the mobile computing device.

When the classifier unit 208 determines that the mobile computing device 102's current configuration is included in the malicious and pathway configuration database received from the network server (i.e., that the mobile computing device 102's current configuration is leading to malicious behavior), the classifier unit 208 may notify the actuator unit 210, which may perform various actions or operations to prevent malicious behavior or other performance-degrading activities on the mobile computing device before such malicious behavior occurs.

Figure 3:
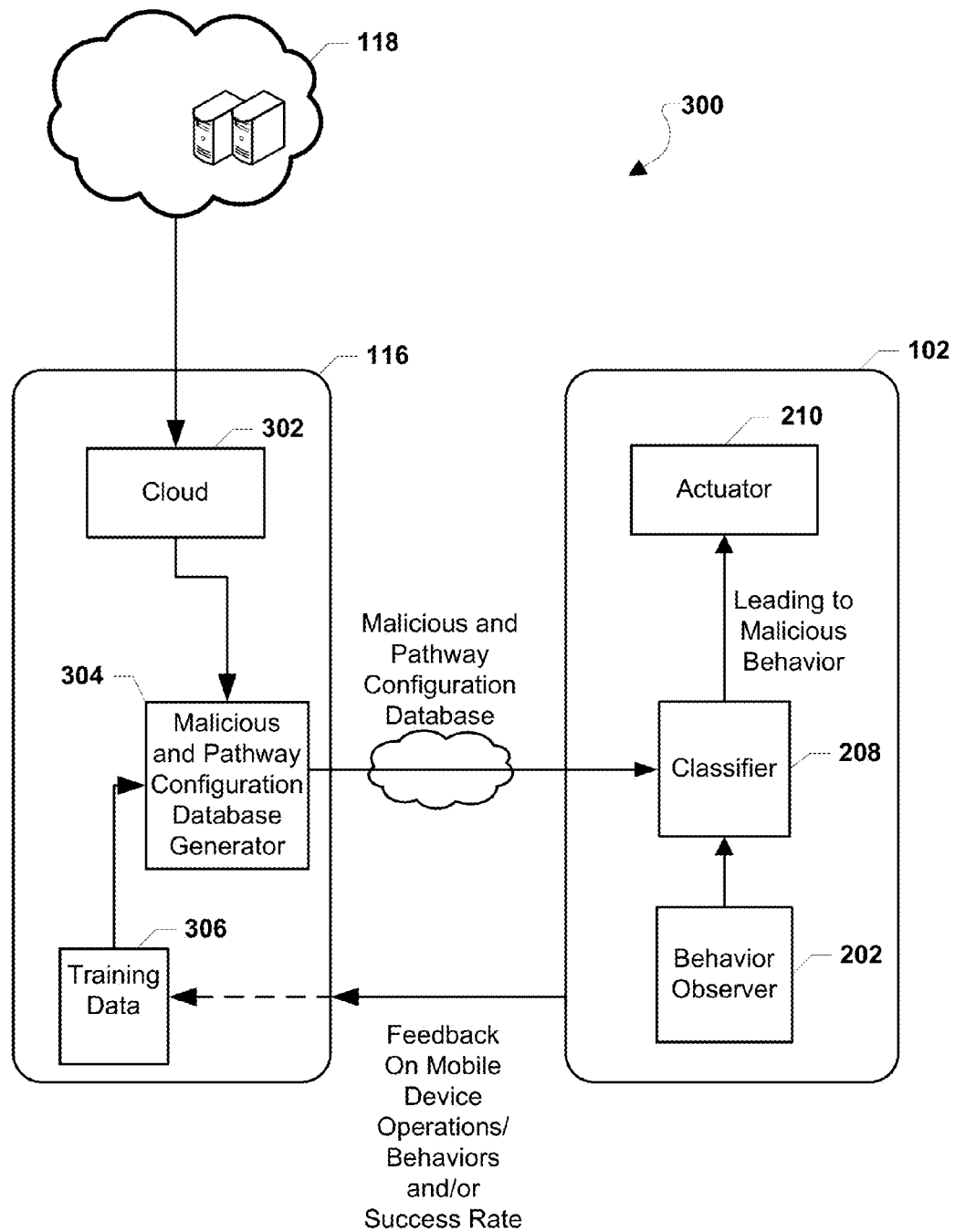
FIG. 3 is a block diagram illustrating example components and information flows in an aspect system with a network server configured in a cloud service/network to identify malicious configurations and configurations leading to malicious behavior and to send these configurations to a mobile computing device for use in avoiding malicious behaviors on a mobile computing device.

FIG. 3 illustrates example components and information flows in an aspect system 300 that includes a network server 116 configured to work in conjunction with a cloud service/network 118 to intelligently and efficiently identify malicious configurations and configurations leading up to malicious behaviors on the mobile computing device 102. In the example illustrated in FIG. 3, the network server 116 includes a cloud unit 302, a malicious and pathway configuration database generator unit 304, and a training data unit 306. The mobile computing device 102 includes a behavior observer unit 202, a classifier unit 208, and an actuator unit 210. In an aspect, the classifier unit 208 may be included in, or as part of, the behavior analyzer unit 204 (illustrated in FIG. 2). In an aspect, the model generator 304 unit may be a real-time online classifier.

The cloud unit 302 may be configured to receive a large amount of information from a cloud service/network 118 and generate a full or robust data/behavior model that includes all or most of the features, data points, and/or factors that lead to malicious behaviors. In an aspect, the information from the cloud service/network 118 may include configuration information and configuration histories reported from multiple mobile computing devices that detected some form of malicious behavior. For example, multiple mobile computing devices may have reported malicious behavior for a particular configuration and may have also reported their configurations/states/instructions leading up to the malicious behavior detected.

The malicious and pathway configuration database generator 304 may generate a malicious and pathway configuration database that includes behavior models based on a full behavior model generated in the cloud unit 302. In an aspect, generating the behavior models may include generating one or more reduced feature models (RFMs) that include a subset of the features and data points included in the full model generated by the cloud unit 302. In an aspect, the malicious and pathway configuration database generator 304 may generate a malicious and pathway configuration database that includes an initial feature set (e.g., an initial reduced feature model) that includes information determined to have a highest probably of enabling the classifier unit 208 to conclusively determine whether a particular mobile computing device behavior is leading to malicious behavior. The malicious and pathway configuration database 304 may send the generated malicious and pathway configuration database to the classifier unit 208.

The behavior observer unit 202 may monitor/observe mobile computing device behaviors on the mobile computing device 102, generate observations, and send the observations to the classifier unit 208. The classifier unit 208 may perform real-time analysis operations, which may include comparing behavior models in the malicious and pathway configuration database to configuration information collected by the behavior observer unit 202 to determine whether the mobile computing device 102's current state is leading to malicious behavior. The classifier unit 208 may determine that a mobile computing device behavior is leading to malicious behavior when the classifier unit 208 determines that the mobile computing device 102's current configuration matches a pathway configuration included in the malicious and pathway configuration database. As discussed above with reference to FIG. 2, when the classifier unit 208 finds a match, the classifier unit 208 may alert the actuator unit 210 to begin taking steps to avoid future malicious behavior.

In another aspect, the mobile computing device 102 may send the results of its operations and/or success rates associated with the application of models to the network server 116. For example, the classifier unit 208 may not find a match in the malicious and pathway configuration database, but malicious behavior may still occur, thereby indicating previously undetected malicious behavior (i.e., a gap in protection) that the mobile computing device 102 may report to the network server 116 to include in a next distribution of malicious and pathway configuration databases. The network server 116 may generate training data (e.g., via the training data unit 306) based on the results/success rates for use by the model generator 304. The model generator may generate updated malicious and pathway configuration databases based on the training data, and send the updated malicious and pathway configuration databases to the mobile computing device 102 and other mobile computing devices on a periodic basis.

Figure 4:
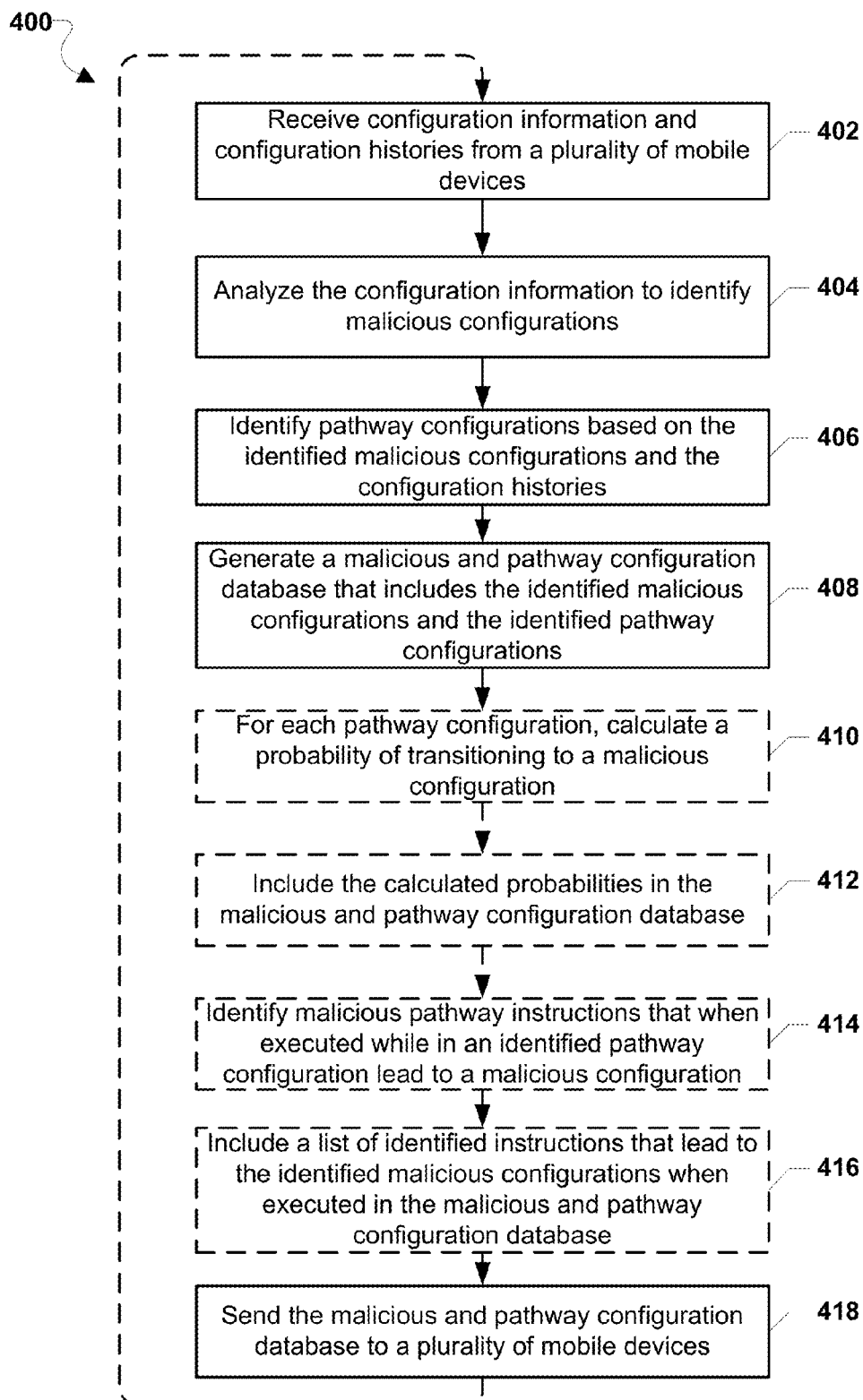
FIG. 4 is a process flow diagram illustrating an aspect method for sending a malicious and pathway configuration database that includes information regarding malicious configurations and pathway configurations to mobile computing devices.

FIG. 4 illustrates an aspect method 400 that may be implemented on a network server for sending mobile computing devices a malicious and pathway configuration database that identifies malicious configurations and pathway configurations. In performing method 400, the network server may function as a centralized hub that receives, compiles, and analyzes information from multiple mobile computing devices to identify configurations indicative of malicious behavior and the pathway configurations leading to those malicious configurations. The server may also provide reports to the multiple mobile computing devices that enable the mobile computing devices to detect whether their current behavior (or the behavior of an application or process operating on the mobile computing devices) is trending towards malicious behavior.

In block 402, the network server may receive configuration information and configuration histories from a plurality of mobile computing devices. In an aspect, when a mobile computing device detects malicious behavior (e.g., being hacked, malware, or viruses, etc.), the mobile computing device may send the network server a behavior vector or similar information that represents the mobile computing device's configuration at the time the mobile computing device discovered the malicious behavior. Additionally, the mobile computing devices may also send configuration histories that describe the progression of configurations that occurred up until the malicious behavior was detected.

In an aspect, the mobile computing device may maintain a list of configuration changes that begins from an initial configuration, such as a startup configuration. For example, a mobile computing device may detect malware activity when its behavior vector is [0, 2, 1, 0, . . . , 4]. The mobile computing device may send the behavior vector [0, 2, 1, 0, . . . , 4] to the network server and information for retracing the mobile computing device's configurations from [0, 2, 1, 0, . . . , 4] to an earlier configuration, such as an initial configuration (e.g., [0, 0, 0, 0, . . . , 0]). In another aspect, the mobile computing device may conserve resources by maintaining only an abbreviated configuration history (i.e., the mobile computing device may only keep an account of a certain number of previous configurations leading up to the malicious configuration).

In block 404, the network server may analyze the configuration information to identify malicious configurations.

In an aspect, the network server may identify malicious configurations by matching identical or similar behaviors reported by several mobile computing devices to represent malicious behavior. In a further aspect, the network server may identify a configuration as malicious only when a certain number or percentage of mobile computing devices identifies the configuration as malicious. In other words, the network server may employ a confidence threshold to label behaviors as malicious only when there is some consensus among the mobile computing devices reporting in.

In another aspect, the network server may receive configuration information from various types and models of mobile computing devices that may not share the same capabilities or configurations, and thus the mobile computing device may have dissimilar configuration information/behavioral vectors. In such an aspect, the network server may identify malicious configurations by implementing various pattern matching algorithms or strategies to detect malicious configurations or particular features that multiple mobile computing devices commonly report to represent malicious behavior. In other words, the network server may compile thousands of reports from mobile computing devices of different models and determine the configuration characteristics consistently present at the time the mobile computing devices detected malicious behavior. For example, the network server may determine that various types of mobile computing devices almost always reported malicious behavior when their configurations included "screen off," "accessing contact information," and "transmitting data."

In block 406, the network server may identify pathway configurations based on the identified malicious configurations. In an aspect, a pathway configuration may be a "precursor" configuration leading up to a malicious configuration. In other words, a pathway configuration may be at risk of evolving into a malicious configuration under some circumstances. For example, a pathway configuration may be one or two configuration changes away from being a malicious configuration.

In an aspect, after receiving numerous configuration histories, the network server may implement pattern recognition or state machine analysis (if the configuration history is presented as transitions between states) to discover one or more patterns or configurations leading to an ultimate malicious configuration. In other words, the network server may use the configuration histories from the various mobile computing devices to "walk back" (i.e., along "configuration paths") from the malicious configuration to identify an earlier configuration or configurations that have led to the malicious configurations. These earlier configurations may be identified as pathway configurations, as defined above, when the analysis determines that there is a significant probability that a subsequent configuration will be malicious. As discussed below with reference to FIG. 7A, any given configuration or state may evolve or be transformed into any number of subsequent configurations or states depending upon the instructions or operations that are performed next. Thus, a configuration that preceded a malicious configuration may not necessarily lead to the malicious configuration if other instructions or operations are performed. To address this, the server analysis may determine from the reported information how frequently a given configuration leads directly to a malicious configuration, and identify as "pathway configurations" only those configurations that frequently (i.e., the frequency exceeds a threshold value or probability) lead to malicious configurations. For example, the network server may only classify a configuration as a pathway configuration when there is over a 10% chance that the configuration will lead to malicious behavior. The server analysis may also identify the instructions/operations that when performed transform a pathway configuration into a malicious configuration.

In an aspect, the network server may first identify a malicious configuration/state as discussed above with reference to block 404, one or more intermediate configurations, and a starting configuration. For example, the network sever may first identify that "transmitting address book information while the screen is off" is a malicious configuration and may "walk back" to discover that "accessing address book information while the display screen is off" is a pathway configuration that frequently leads to "transmitting address book information while the screen is off."

In an aspect, to increase the effectiveness of using pathway configurations as early warning signs of future malicious behavior, the network server may only classify a configuration as being a "pathway configuration" when that configuration is within a threshold number of "steps" away from a malicious configuration. The server analysis may also identify the subsequent pathway configurations leading directly to malicious behavior, as well as instructions/operations that when performed take the mobile computing device through the series of steps from the identified pathway configuration to a malicious configuration.

In block 408, the network server may generate a malicious and pathway configuration database that includes the identified malicious configurations and the identified pathway configurations. In an aspect, the malicious and pathway configuration database may include information that may enable a mobile computing device to assess whether the mobile computing device is at risk of entering a malicious configuration as discussed below with reference to FIGS. 5, 6, 8, 10, and 11.

Figure 9:
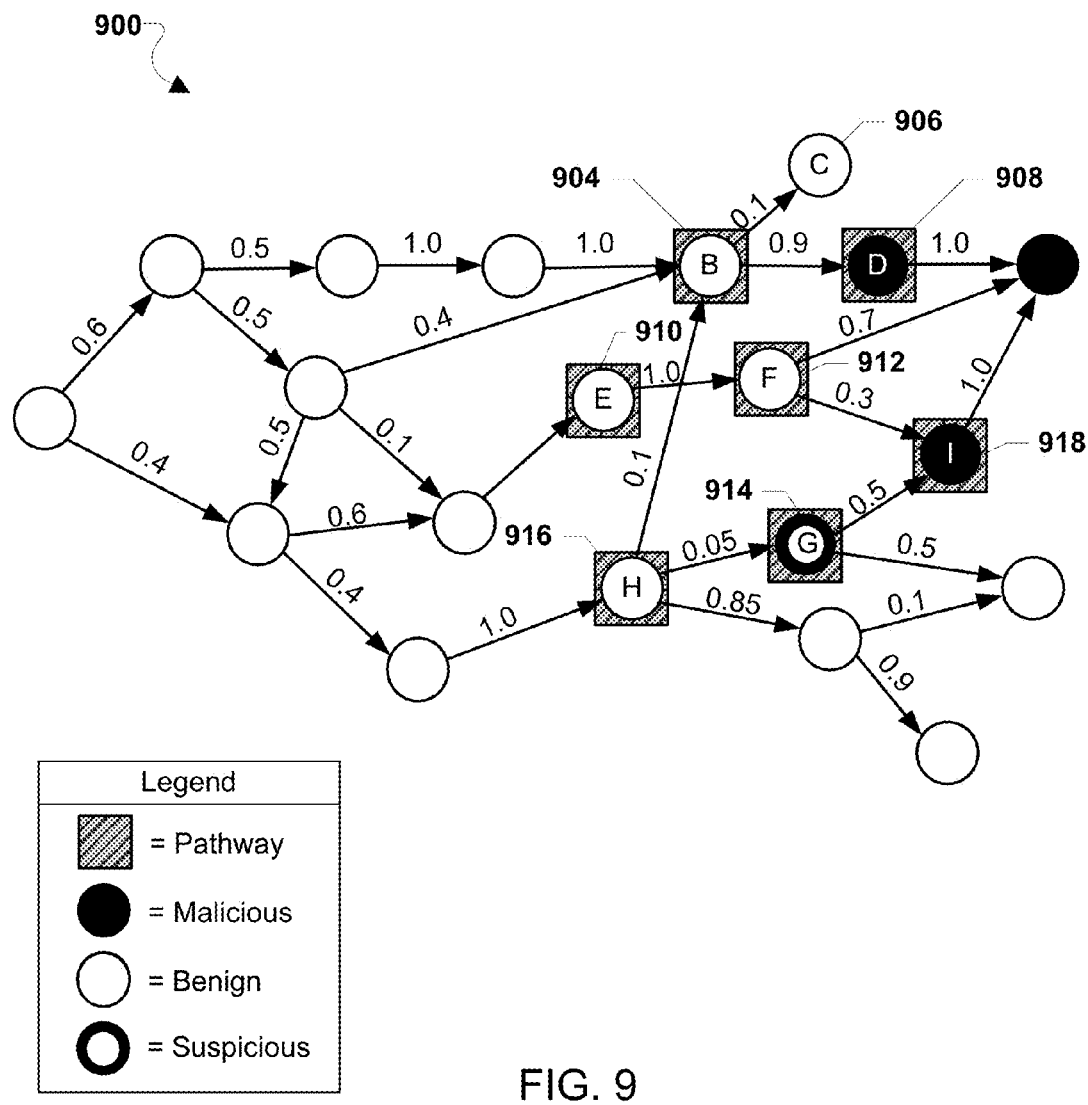
FIG. 9 is a Markov chain diagram illustrating a Markov chain analysis for predicting the probability of malicious behavior in the near future based on transition probabilities between configurations.

As discussed above, in optional block 410, the network server may calculate a probability of transitioning to a malicious configuration for each identified pathway configuration. To calculate the probabilities, the network server may analyze the configuration histories of thousands of mobile computing devices to determine how often a transition from a pathway configuration to a malicious configuration occurs. For example, after analyzing reports from 100,000 mobile computing devices, the network server may determine that 70,000 mobile computing devices transitioned from a certain pathway configuration to a benign configuration (i.e., 70% or 0.7) and that 30,000 transitioned from the certain pathway configuration to a malicious configuration (i.e., 30% or 0.3). In an aspect, the network server may represent this information in a Markov Chain analysis that includes each configuration (i.e., state) and the probabilities for transitioning from one configuration to another as illustrated in FIG. 9 below. The network server may also include the calculated probabilities in the malicious and pathway configuration database in optional block 412.

Also as discussed above, in optional block 414, the network server may identify malicious pathway instructions or operations that when executed while in an identified pathway configuration lead to a malicious configuration. In this operation, the network server may analyze the behavior vector information and configuration histories to identify the code, parameters, or other instructions that cause a pathway configuration to turn into a malicious configuration. The network server may identify such instructions in the context of particular pathway configurations. Thus, the network server may determine the instructions that, when executed, cause pathway configurations to become malicious, thereby enabling a mobile computing device to better determine whether it is at risk of evolving to a malicious configuration. In other words, the network server may determine that a mobile computing device in a particular pathway configuration will become malicious after executing certain instructions that are referred to herein as "malicious pathway instructions." It should be noted that malicious pathway instructions may only result in malicious behavior or malicious configurations when they are executed while the mobile computing device is in a pathway configuration. In this manner the various aspects differ from conventional malware detection systems because the aspects enable recognizing and reacting to instructions/operations that in most circumstances are safe and not associated with malicious behaviors.

The network server may include a list of the identified instructions that lead to the identified malicious configurations when executed in the malicious and pathway configuration database in optional block 416. In a further aspect, the network server may also include an association between a pathway configuration and the malicious pathway instruction or instructions that will cause the pathway configuration to become malicious. A mobile computing device may utilize a malicious and pathway configuration database that includes a list of instructions leading to malicious behavior to avoid such malicious behavior as further described below with reference to FIG. 11.

In block 418, the network server may send the malicious and pathway configuration database to a plurality of mobile computing devices. In various aspects, the mobile computing device may use the malicious and pathway configuration databases for use in preemptively identifying pathway configurations that may lead to malicious behavior. In an aspect, the malicious and pathway configuration databases may present the malicious and pathway configurations as states in a finite state machine, paths, or as behavior vector values that can be utilized by a behavior analyzer unit 204 and/or classifier unit 208 operating on the mobile computing device.

In an optional aspect, the network server may execute the process in a loop as it continually receives behavior vector information and configuration histories from mobile computing devices in block 402. In such an aspect, the network server may receive the behavior vector information and configuration histories on a rolling basis. In other words, the network server may continually receive information of malicious behavior from the mobile computing devices as they occur, and the network server may continually analyze and identify malicious configurations and pathway configurations as more behavior vector information and configuration histories are receive. As such, the network server may repeat the process in order to continually send out updated malicious and pathway configuration databases to the mobile computing devices based on new information received.

Figure 5:
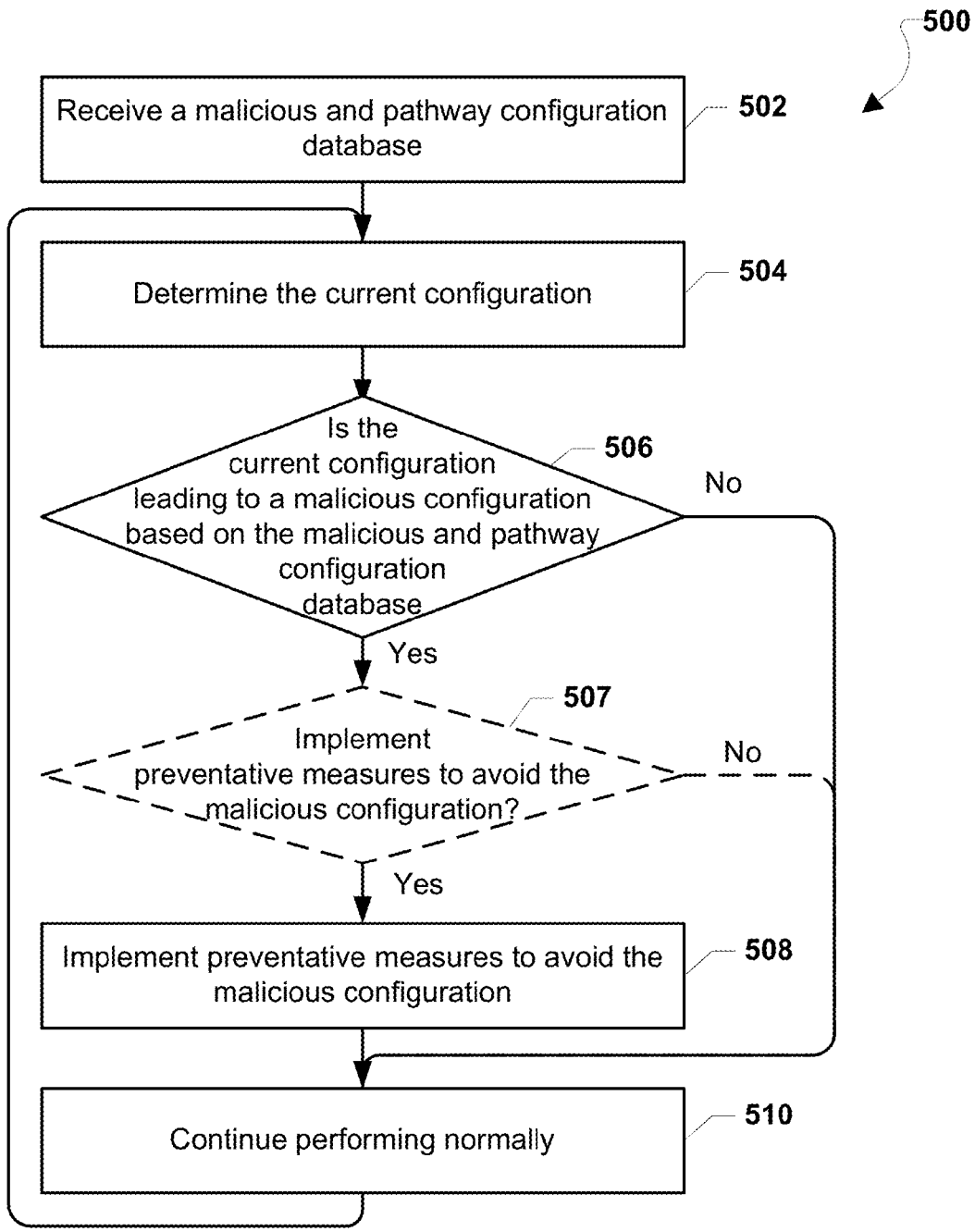
FIG. 5 is a process flow diagram illustrating an aspect method for predicting and implementing preventative measures to avoid a malicious configuration on a mobile computing device.

FIG. 5 illustrates an aspect method 500 that may be implemented by a mobile computing device for preemptively identifying malicious configurations. In an aspect, the mobile computing device may utilize a malicious and pathway configuration database that identifies malicious configurations and pathways configurations to determine when the state of the mobile computing device (or the current configuration of an application, process, or component of the mobile computing device) is leading to malicious behaviors. Based on that determination, the mobile computing device may implement various measures to avoid or prevent such malicious activity.

In block 502, the mobile computing device may receive a malicious and pathway configuration database. As discussed above in block 418 of method 400 described with reference to FIG. 4, the network server may use crowd-sourced configuration information and/or configuration histories to identify certain configurations that have a risk of leading to some form of malicious behavior reported by other mobile computing devices. The network server may compile information regarding malicious and pathway configurations into a malicious and pathway configuration database and may send one or more malicious and pathway configuration databases to the mobile computing device. In a further aspect, the mobile computing device may routinely receive the malicious and pathway configuration databases as part of a periodic service that the network service manages (e.g., the mobile computing device may register with the network server to receive malicious and pathway configuration databases).

In block 504, the mobile computing device may determine its current configuration. As described above with reference to FIG. 2, in an aspect, a behavior observer unit 202 may collect various types of information regarding the current operations/status/state of the mobile computing device (i.e., "behavior observations"), as well as the configuration or state changes the mobile computing device has undergone.

In an aspect, the mobile computing device may reference a behavior vector to ascertain the mobile computing device's current configuration. In another aspect, a behavior analyzer unit 204 may receive the behavior observations from the behavior observer unit 202, and the behavior analyzer unit 204 may use the behavior observations to generate a behavior vector or another indication of the mobile computing device's current configuration. For example, the behavior analyzer unit 204 may determine that the mobile computing device's current configuration indicates that data is being transmitting and that the screen is off. The behavior analyzer unit 204 may conduct finite-state analysis using the behavior observations, by which the behavior analyzer unit 204 may determine the mobile computing device's current configuration by following a series of state transitions to the current state (i.e., current configuration). Using a finite-state-machine analysis to determine the current configuration is described in further detail below as discussed with reference to FIG. 7A.

In determination block 506, the mobile computing device may determine whether a current configuration is leading to a malicious configuration based on the malicious and pathway configuration database. In other words, the mobile computing device may determine whether its current configuration is a pathway configuration. In an aspect, a behavior analyzer unit 204 and/or a classifier unit 208 may compare the mobile computing device's current configuration (e.g., a behavior vector representing the mobile computing device's current configuration) to the pathway configurations and malicious configurations included in the malicious and pathway configuration database received from the network server to determine whether the current configuration matches a pathway configuration included in the malicious and pathway configuration database.

When the mobile computing device determines that the current configuration is not leading to a malicious configuration based on the malicious and pathway configuration database (i.e., determination block 506="No"), the mobile computing device may continue performing normally in block 510. The process may continue in loop as the mobile computing device may continue by determining the current configuration of the mobile computing device in block 504. Thus, in an aspect, the mobile computing device may continually check its current configuration to make sure it is not at risk of a future malicious behavior.

When the mobile computing device determines that the current configuration is leading to a malicious configuration based on the malicious and pathway configuration database (i.e., determination block 506="Yes"), the mobile computing device may determine whether to implement preventative measures to avoid the malicious configuration in optional determination block 507.

In some instances, the mobile computing device may experience poor or unacceptable performance by implementing preventative measures every time the current configuration of the device or a component on the device is determined to be leading to a malicious configuration. Because there is no certainty that the current configuration will actually evolve into a malicious configuration, the mobile computing device may selectively implement preventative measures only when there is a certain risk of malicious behavior in the near future that exceeds a predefined threshold in order to achieve an effective balance of security and performance. For example, the mobile computing device may only implement preventative measures when the current configuration has a substantial likelihood of leading to a malicious configuration as further described below with reference to FIG. 8. Similarly, in another example, the mobile communication device may only implement preventative measures when a calculated risk of entering a malicious configuration from the current configuration exceeds a predefined probability/risk threshold as further described below with reference to FIG. 10.

In a further aspect, the predefined threshold may be set based on user input received from a user interface component on the mobile computing device, and the predefined threshold may reflect a user's security-to-performance preference. For example, a user at an intelligence agency may require higher security (i.e., more instances in which the mobile computing device determines to implement preventative measure to avoid a future malicious configuration) to ensure that all the malicious applications are caught, and such a user may configure the mobile computing device to use a low threshold so that preventative measures are taken most or all of the time. In another example, another user may decide that stopping every malicious behavior is not worth the performance impact and may configure the mobile computing device to implement preventative measures only when the risk of entering a malicious configuration exceeds a high threshold.

When the mobile computing device determines not to implement preventative measures to avoid the malicious configuration (i.e., optional determination block 507="No"), the mobile computing device may continue performing normally in block 510. The process may continue in loop as the mobile computing device may continue by determining the current configuration of the mobile computing device in block 504. Thus, in an aspect, the mobile computing device may continually check its current configuration to make sure it is not at risk of a future malicious behavior.

When the mobile computing device determines to implement preventative measures to avoid the malicious configuration (i.e., optional determination block 507="Yes"), the device may implement preventative measures to avoid the malicious configuration in block 508. In an aspect, the mobile computing device may perform various operations to avoid a future malicious configuration, such as determining the applications/processes associated with the future malicious configurations and terminating, quarantining, and/or curing those applications/processes. Implementing preventative measures is described below in further detail with reference to FIG. 6.

After implementing preventative measures, the mobile computing device may continue performing normally in block 510. The process may continue in a loop as the analysis engine may continue by determining the current configuration of the mobile computing device in block 504.

While the above description pertains to determining whether a mobile computing device's current configuration is leading to a malicious configuration, in further aspects, the mobile computing device or a component operating on the mobile computing device may instead determine whether the current configuration of an individual hardware or software component operating on the mobile computing device is leading to a malicious configuration. For example, the mobile computing device may determine that an application's current configuration is a pathway configuration that leads to a malicious configuration. In these alternative aspects, the malicious and pathway configuration database received from the network server may include information regarding malicious and pathway configurations necessary for the mobile computing device (or a component operating the mobile computing device) to determine whether individual applications or hardware components are at risk of malicious behavior in the near future.

Figure 6:
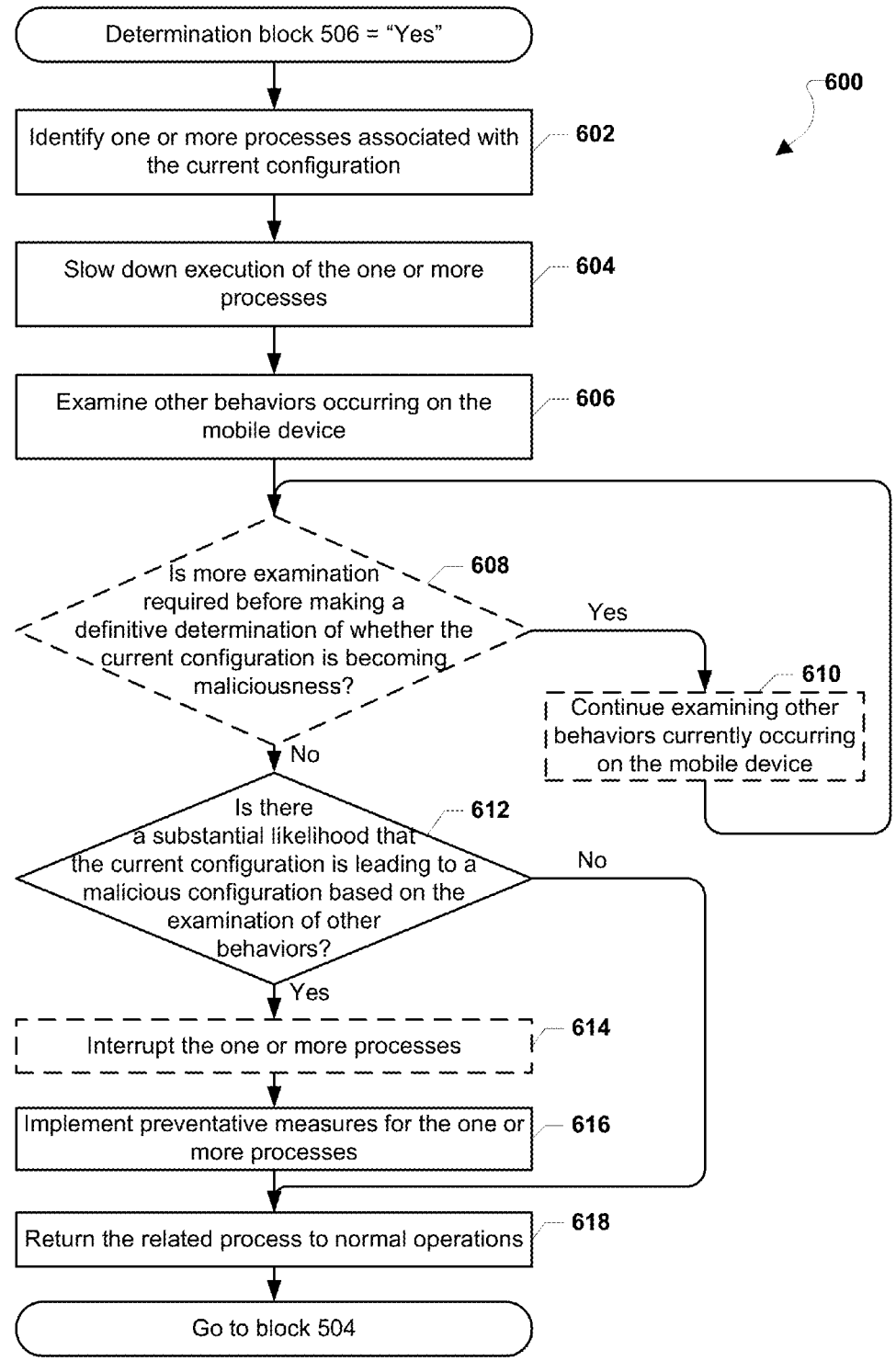
FIG. 6 is a process flow diagram illustrating an aspect method for implementing preventative measures in response to determining that there is a substantial likelihood of malicious behavior in the near future based in part on an examination of other behaviors occurring on the mobile computing device.

FIG. 6 illustrates an aspect method 600 that may be implemented on a mobile computing device for implementing preventative measures to avoid a malicious configuration in the near future when the mobile computing device is currently in a pathway configuration. In an aspect, after determining that it is currently in a pathway configuration, the mobile computing device may slow or pause one or more processes associated with the current pathway configuration to provide the mobile computing device with sufficient time to examine other behaviors occurring on the mobile computing device to assess whether it is actually in danger of malicious behavior in the near future.

The operations of method 600 implement an aspect of the operations of block 508 of method 500 described above with reference to FIG. 5. Thus, the mobile computing device may begin performing method 600 after determining that the mobile computing device is currently in a pathway configuration leading to malicious behavior (i.e., determination block 506="Yes").

In block 602, the mobile computing device may identify one or more processes associated with the current configuration. In an aspect, the one or more processes may be applications, programs, scripts, hardware components, or other components operating on the mobile computing device. For example, the current configuration may include "camera on" and "screen off," and the mobile computing device may associate those characteristics with a camera application currently running on the mobile computing device.

In an another aspect, the mobile computing device may receive information included in the malicious and pathway configuration database that identifies one or more processes associated with the mobile computing device's current pathway configuration, and the mobile computing device may leverage this information to identify one or more processes related to the current configuration. For example, after determining that it is in a pathway configuration, the mobile computing device may reference the malicious and pathway configuration database to discover that a social media application operating on the mobile computing device is associated with the pathway configuration and thus is likely responsible for leading the mobile computing device to malicious behavior. In a further aspect, the malicious and pathway configuration database may include the identities of more than one process or component linked to a pathway configuration.

In block 604, the mobile computing device may slow down execution of the one or more processes. In an aspect, slowing down the one or more processes may be an initial preventative measure that arrests on-going development of malicious behavior, which may occur soon after initially discovering that the current configuration is a pathway configuration as described above in determination block 506 of method 500 described with reference to FIG. 5. In another aspect, the mobile computing device may instead completely stop the one or more processes' execution.

While slowing or pausing the execution of the one or more processes may temporarily reduce the functionality and performance of the mobile computing device, such costs may be outweighed by the potential benefits of avoiding malicious behavior in the near future. The various aspects further reduce these costs because the mobile computing device may judiciously intervene in processes' operations only after determining that the mobile computing device is currently in a pathway configuration. Thus, by taking action only when there is a detected risk of future malicious behavior (i.e., when the mobile computing device is currently in a pathway configuration), the mobile computing device may protect itself while causing minimal impact on the one or more processes or components operating on the mobile computing device.

Returning to FIG. 6, in block 606, the mobile computing device may examine the other behaviors currently occurring on the mobile computing device. In an aspect, while the one or more processes are slowed or stopped, the mobile computing device may investigate other on-going activities in an attempt to better predict whether the current configuration is trending towards malicious behavior. For example, the mobile computing device may scan applications or hardware components related to or used by the one or more processes in an attempt to discover other unusual or suspicious behavior. In another aspect, the examination of other behaviors may include comprehensive and thorough scanning and analysis, and slowing down the one or more processes may enable the mobile computing device to complete these comprehensive scans before the current configuration evolves into a malicious configuration.

In optional determination block 608, the mobile computing device may determine whether more examination is required before making a definitive determination of whether the current configuration is becoming malicious. When the mobile computing device determines that more examination is needed (i.e., optional determination block 608="Yes"), the mobile computing device may continue examining other behaviors currently occurring on the mobile computing device in optional block 610. The mobile computing device may continue examining other behaviors until it is reasonably capable of making a definitive determination of whether the current configuration is becoming malicious and/or what may be causing the mobile computing device to trend toward malicious behavior.

Thus, when the mobile computing device determines that more examination is not required (i.e., optional determination block 608="No"), the mobile computing device may determine whether there is a substantial likelihood that the current configuration is leading to a malicious configuration based on the examination of other behaviors in determination block 612. In an example in which the one or more processes are a camera application that is taking a picture while the screen is off (i.e., the current configuration is "camera on" and "screen off"), the mobile computing device may conclude that the current configuration is not entering a malicious state (e.g., "screen off," "camera on," and "transmit camera data on") because other activity on the mobile computing device indicates that the screen is about to turn on in response to the user's input. In this example, the current configuration is anticipated to transition to "camera on" and "screen on," which may not be a malicious configuration.

When the mobile computing device determines that there is not a substantial likelihood that the current configuration is leading to a malicious configuration (i.e., determination block 612="No"), the mobile computing device may return the one or more processes to normal operations in block 618. In an aspect, the one or more processes may continue operations at a normal rate.

When the mobile computing device determines that the current configuration is becoming malicious (i.e., determination block 612="Yes"), the mobile computing device may interrupt the one or more processes in optional block 614. In an aspect, interrupting the one or more processes may include completely stopping execution of or terminating the one or more processes.

In block 616, the mobile computing device may implement preventative measures for the one or more processes. In an aspect, the mobile computing device may implement various techniques to avoid malicious behavior, including isolating the one or more processes from interacting with other applications or components on the mobile computing device and resetting/restarting the one or more processes from an initial, benign configuration. Other techniques may include restoring the one or more processes to an earlier processing point that is known to be benign (e.g., reverting an application to an earlier version). The mobile computing device may also return the one or more processes to normal operations in block 618.

The mobile computing device may continue by determining the current configuration in block 504 of method 500 described above with reference to FIG. 5.

FIG. 7A illustrates a state diagram of configurations and transitions between configurations on an aspect mobile computing device represented as a finite state machine ("FSM") 700.

In an aspect, the FSM 700 may include a state (i.e., a configuration) for each of the mobile computing device's possible configurations ("screen on," "screen off," "sending data," etc.). The FSM 700 may also represent how the mobile computing device's configuration changes over time with transitions from one state/configuration to another. For example, the FSM 700 may indicate that a particular configuration A 702 (e.g., "screen on" and "sound off") may transition to another configuration B 704 (e.g., "screen on" and "sound on").

In an aspect, a network server may generate the FSM 700 based on configuration information and/or configuration histories obtained from multiple mobile devices. For instance, the network server may receive configuration information from multiple mobile computing devices and may compile this information to generate a FSM representing the configurations/states of the mobile computing devices and the transitions between those configurations. In an example, the network server may receive configuration histories from thousands of mobile computing devices and may generate a FSM that represents configuration transitions from an initial configuration (e.g., a "power on" state) to various intermediate and terminal configurations. In another aspect, because different mobile computing devices may have different features or functionalities, the network server may generate specialized FSMs for mobile computing devices sharing similar characteristics (e.g., the same model number, manufacturer, etc.).

In another aspect, the network server may classify each configuration/state in the FSM 700 as a benign configuration, a suspicious configuration, or a malicious configuration. In an aspect, the network server may perform a behavioral analysis based on the configuration information received from the multiple mobile computing devices. For example, the network server may identify configurations consistently linked with reports of malicious behavior (i.e., malicious configurations), configurations that require more examination to determine whether they are malicious (i.e., suspicious configurations), and configurations that do not indicate malicious behavior (i.e., benign configurations). Thus, in a further aspect, the network server may produce a FSM that describes configurations and transitions between those configurations, as well as each configuration's classification.

Additionally, in another aspect, after classifying the configurations in the FSM 700, the network server may "walk back" from malicious configurations to identify configurations that have a substantial risk of leading to those malicious configurations (i.e., pathway configurations) as described above with reference to FIG. 4. For example, the network server may use the configuration information and configuration histories received from the multiple mobile devices to determine particular configurations that consistently indicate the beginning of a trend toward malicious behavior.

In another aspect, after generating the FSM 700, classifying the configurations in the FSM 700, and identifying pathway configurations leading to malicious configurations in the FSM 700, the network server may send this information regarding the FSM 700 to the mobile computing device, such as in a malicious and pathway configuration database as described above with reference to FIG. 4.

In an aspect, the mobile computing device may utilize the FSM 700 to track its configurations in real-time. For example, during normal operations, the mobile computing device may follow the configuration transitions in the FSM 700 to keep track of its current configuration. In another aspect, the mobile computing device may determine whether its current configuration is a pathway configuration (e.g., as indicated in a malicious and pathway configuration database received from the network server). When the mobile computing device determines that it is currently in a pathway configuration, the mobile computing device may analyze the FSM 700 to determine potential configurations to which the mobile computing device may transition in the near future. In other words, the mobile computing device may perform finite-state-machine analysis and "walk forward" from the mobile computing device's current configuration to determine the configurations that may next occur (i.e., potential future configurations).

In an aspect, the potential future configurations may be configurations to which mobile computing device may reach after a particular number of transitions. For example, the mobile computing device's current configuration may be "screen off and sound off." Thus, the mobile computing device may have two potential future configurations that may be reachable in one transition/configuration change, such as "screen on and sound off" and "screen off and sound on." In a further example, the mobile computing device may transition to another potential future configuration reachable in two transitions (e.g., "screen on and sound on").

In an aspect, after identifying the potential future configurations, the mobile computing device may determine their classifications and may take necessary steps to prevent or avoid entering a malicious configuration in the future based on the classifications of those potential future configurations. In an example, the mobile computing device may currently be in configuration A 702, which is benign and not a pathway configuration (i.e., there is no identified risk of future malicious behavior given the current configuration). In this event, the mobile computing device may continue operating normally. In other words, the mobile computing device may quickly check whether its current state is leading to malicious behavior in real time (i.e., during actual, normal operations) without having to spend considerable computation resources.

In a continuation of the above example, the mobile computing device may undergo one or more configuration changes over time that may cause the mobile computing device to transition from configuration A 702 to a configuration B 704. Upon entering configuration B 704, the mobile computing device may determine that its current configuration is a pathway configuration. Thus, the mobile computing device may determine that there is a risk of transitioning to a malicious configuration in the near future. At this point, the mobile computing device may slow or stop one or more processes related to the configuration B 704 to allow for additional time to assess the likelihood that malicious behavior will occur in the near future. Thus, by waiting to begin preventative measures until there is an identified risk of future malicious behavior, the mobile computing device may avoid unnecessary computations.

In an aspect, after entering pathway configuration, the mobile computing device may determine whether there is a substantial likelihood of malicious behavior in the near future based on the classification of its current configuration and the classifications of potential future configurations as illustrated in table 725 described with reference to FIG. 7B. In another aspect further described below with reference to FIG. 9, the mobile computing device may utilize information received from the network server to determine the probability (e.g., a value from 0.0 to 1.0) of malicious behavior occurring in the near future, and the device may determine that there is a substantial likelihood of malicious behavior when the probability of malicious behavior exceeds a certain threshold probability (e.g., 25%).

In an example, after the mobile computing device determines that configuration B 704 is a pathway configuration, the mobile computing device may determine that configuration B 704 is benign and that the potential future configurations reachable in one step (i.e., configuration C 706 and configuration D 708) are benign and malicious, respectively. In an aspect, the mobile computing device may reference a table 725 and, based on the table lookup, conclude that that there is a substantial likelihood of future malicious behavior because configuration B 704 leads directly to a malicious configuration.

In another example, when the mobile computing device's current configuration is configuration E 710, the mobile computing device may determine that there is an insubstantial likelihood of eventually leading to malicious behavior because the only potential future configuration (i.e., configuration F 712) is benign. However, if the mobile computing device transitions to configuration F 712, the mobile computing device may determine that there is a substantial risk of future malicious behavior because the potential future configurations are all malicious.

In another example in which the mobile computing device's current configuration is configuration G 714, the mobile computing device may determine there is a substantial likelihood that the current configuration is leading to malicious behavior because the configuration G 714 is suspicious. In an aspect, the mobile computing device (or the network server) may classify a configuration as suspicious when more information is needed in order to determine whether a configuration is benign or malicious.

In an aspect, after determining the likelihood of future malicious behavior, the mobile computing device may determine whether to implement various preventative measures to avoid future malicious behavior based on the determined likelihood. The process of determining the appropriate measures to take based on the determined likelihood is described below with reference to FIG. 8.

Figure 8:
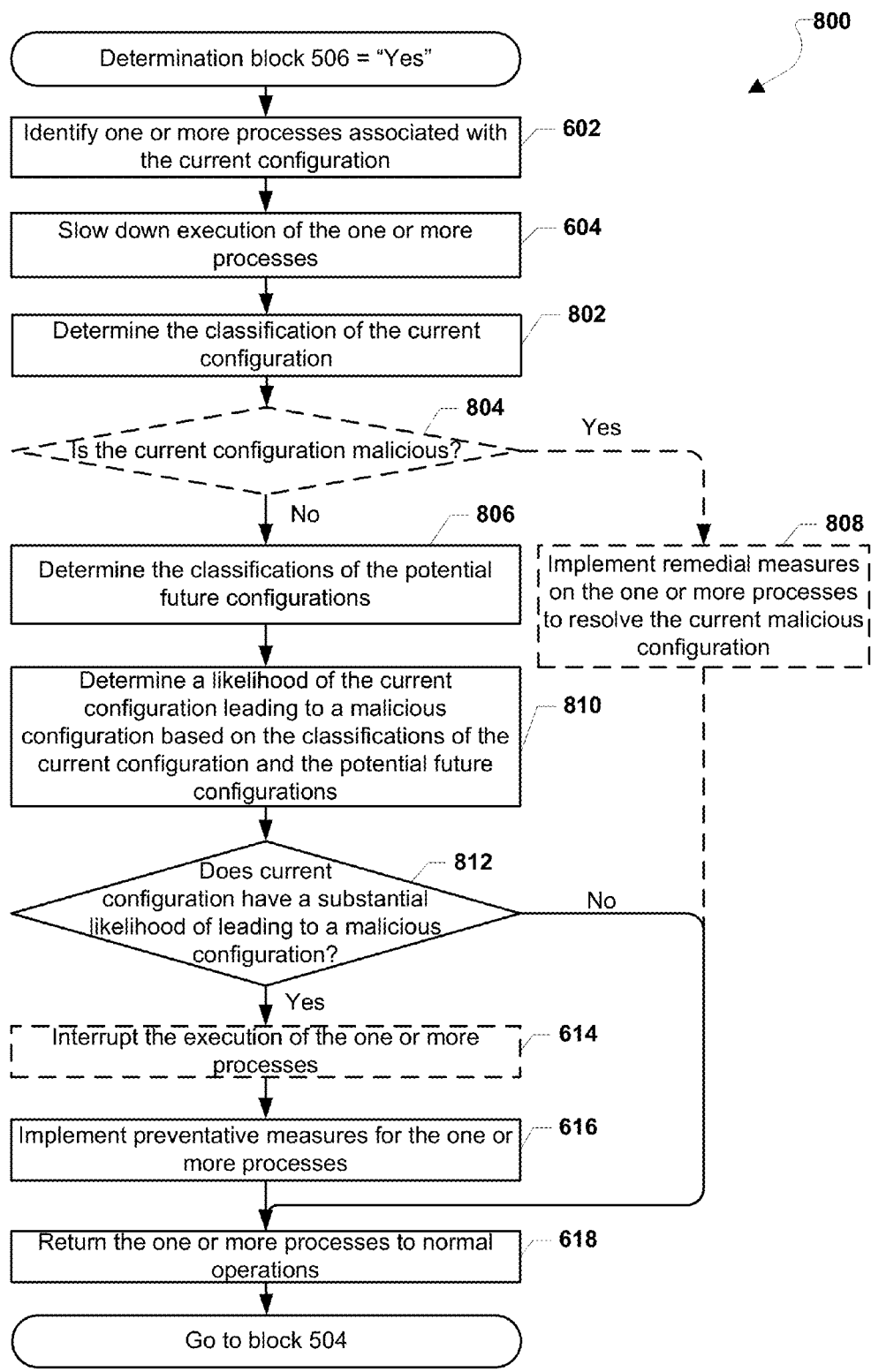
FIG. 8 is a process flow diagram illustrating an aspect method for determining the likelihood of entering a malicious configuration based on the current configuration and potential future configurations.

FIG. 8 illustrates an aspect method 800 that may be implemented on a mobile computing device for implementing preventative measures when there is a substantial likelihood of the current configuration leading to malicious behavior. In an aspect, after determining that it is currently in a pathway configuration (i.e., there is a risk of malicious behavior in the near future), the mobile computing device may determine whether there is a substantial likelihood of experiencing malicious behavior in the near future based on the mobile computing device's current configuration and the configuration to which the mobile computing device may transition from its current configuration.

The operations of method 800 implement an aspect of the operations of block 508 of method 500 described above with reference to FIG. 5. Thus, the mobile computing device may begin performing method 800 after determining that the current configuration is a pathway configuration (determination block 506="Yes") as described above with reference to FIG. 5.

In block 602, the mobile computing device may identify one or more processes associated with the current configuration as described above with reference to FIG. 6. The mobile computing device may also slow down execution of the one or more processes in block 604. In an aspect, by slowing down the execution of the one or more processes, the mobile computing device may have additional time to determine whether preventative measures are necessary to avoid malicious behavior in the near future.

In block 802, the mobile computing device may determine the classification of the current configuration. In an aspect, the mobile computing device may determine whether the current configuration is benign, malicious, or suspicious. In an aspect, a network server may have determined the classifications of the various configurations of the mobile computing device as described with reference to FIGS. 7A-7B (e.g., as part of an FSM describing the mobile computing device's configurations and the transitions between those configurations) and may have sent the classifications as part of a malicious and pathway configuration database received by the mobile computing device.

In another aspect, rather than receiving the mobile computing device's current configuration's classification from the network server as part of a malicious and pathway configuration database, a behavior analyzer unit 204 and/or a classifier unit 208 operating on the mobile computing device may instead determine the classification of the mobile computing device's current configuration locally as discussed above with reference to FIG. 2. For example, a behavior analyzer unit 204 may receive current behavioral observations from a behavioral observer unit and may generate a behavioral vector that represents the mobile computing device's current configuration. The classifier unit 208 may then determine whether the generated behavioral vector indicates that the mobile computing device's current configuration is benign, suspicious, or malicious.

In optional determination block 804, the mobile computing device may determine whether the current configuration is malicious. When the mobile computing device determines that the current configuration is malicious (i.e., optional determination block 804="Yes"), the mobile computing device may implement remedial measures on the one or more processes associated with the current configuration to resolve the current malicious configuration in optional block 808. In an aspect, when the mobile computing device's current configuration is malicious, it may be too late to prevent malicious behavior, and thus the mobile computing device may need to implement remedial measures to stop the on-going malicious behavior. For example, the mobile computing device may scan for and remove malware, viruses, corrupt files, etc. The mobile computing device may also return the one or more processes to normal operations in block 618. The mobile computing device may also continue performing by determining the current configuration in block 504 of method 500 described above with reference to FIG. 5.

When the mobile computing device determines that the current configuration is not malicious (i.e., optional determination block 804="No"), the mobile computing device may determine the classifications of potential future configurations in block 806. In an aspect, the mobile computing device may determine the classifications of the potential future configurations as discussed above with reference to determining the classification of the current configuration in block 802. For example, the mobile computing device may have received the classifications of the potential future configurations as part of a malicious and pathway configuration database sent from a network server. In another example, the mobile computing device (or one or more components operating on the mobile computing device) may generate behavioral vectors based on the potential future configurations and classify those behavioral vectors.

In block 810, the mobile computing device may determine a likelihood that the current configuration will lead to a malicious configuration based on the classifications of the current configuration and the potential future configurations. In an aspect, the mobile computing device may reference a look-up table like table 725 described above with reference to FIG. 7B to determine the likelihood of the current configuration leading to malicious behavior.

In determination block 812, the mobile computing device may determine whether the current configuration has a substantial likelihood of leading to a malicious configuration. For example, the mobile computing device may determine that there is an insubstantial risk of malicious behavior in the near future when the current configuration and all of the potential future configurations are benign. In another example, the mobile computing device may determine that there is a substantial risk of malicious behavior when one or more of the potential future configurations are malicious even though the current configuration is benign.

When the mobile computing device determines that there is an insubstantial likelihood of leading to a malicious configuration (i.e., determination block 812="No"), the mobile computing device may return the one or more processes to normal operations in block 618. The mobile computing device may continue performing by determining the current configuration in block 504 of method 500 described above with reference to FIG. 5.

When the mobile computing device determines that there is a substantial likelihood that the current configuration will lead to malicious behavior (i.e., determination block 812="Yes"), the mobile computing device may optionally interrupt the execution of the one or more processes in optional block 614. In an aspect, the mobile computing device may stop the execution of the one or more processes to provide the mobile computing device sufficient time to avoid any future malicious behavior.

In block 616, the mobile computing device may implement preventative measures for the one or more processes as described above in block 616 of method 600 illustrated in FIG. 6. In an aspect, implementing preventative measures may include adjusting the performance or configuration of the one or more processes to avoid anticipated malicious behavior. For example, the one or more processes may be reverted to an earlier configuration known to be benign.

In block 618, the mobile computing device may return the one or more processes to normal operations. In an aspect (not shown), the mobile computing device may resume the one or more processes' normal execution when the mobile computing device determines that there is no longer a substantial likelihood of malicious behavior in the near future. The mobile computing device may continue performing by determining the current configuration in block 504 of method 500 described above with reference to FIG. 5.

FIG. 9 illustrates a Markov Chain analysis for use with predicting malicious behavior on the mobile computing device. In an aspect, like the FSM analysis described above with reference to FIG. 7A, a Markov Chain analysis may describe a mobile computing device's various configurations and the transitions between those configurations. Further, the Markov Chain analysis may also include the probability of transitioning from one configuration to the next configuration.

In an aspect, the network server may generate a FSM 900 from configuration information/configuration histories received from multiple mobile computing device as described above with reference to FSM 700 illustrated in FIG. 7A. Thus, FSM 900 may include various configurations/states and transitions among those configurations. The network server may also determine a classification (i.e., benign, malicious, or suspicious) for each configuration in the FSM 900 and determine the one or more configurations that lead to malicious behavior (i.e., pathway configurations).

Additionally, in another aspect, the network server may calculate the probability that a pathway configuration will directly transition to a particular potential future configuration (e.g., from "screen off" to "screen on"). For instance, the network server may receive reports from multiple mobile computing devices and may determine the number of times each pathway configuration transitioned to a potential future configuration out of total number of reported transitions. For example, as illustrated in FIG. 9, the network server may have calculated that mobile computing devices in configuration B 904 transitioned to configuration C 906 10% of the time and transitioned to configuration D 908 90% of the time.

In a further aspect, after determining that the current configuration is a pathway configuration, the mobile computing device may determine the classifications of the potential future configurations and the probability that the current configuration will transition to each of the potential future configurations. If the probability of directly transitioning to a malicious potential future configuration exceeds a certain threshold, the mobile computing device may implement preventative measures to avoid the anticipated malicious behavior. For example, a mobile computing device in configuration E 910 may have a 0% chance of directly transitioning to a malicious configuration. In this situation, the mobile computing device may not implement preventative measures because the probability of directly transitioning to a malicious configuration is below a threshold probability. However, a mobile computing device in configuration F 912 may have a 100% (0.7+0.3=1.0=100%) chance of directly transitioning to a malicious state, and therefore, the mobile computing device may implement preventative measures to avoid the very high probability that the current configuration will lead to malicious behavior.

In another aspect, the network server may calculate a probability of eventually transitioning to a malicious configuration for each pathway configuration as described above with reference to optional block 410 in FIG. 4. In an example, a mobile computing device in configuration H 916 may eventually transition to two malicious configurations (i.e., configuration D 908 and configuration I 918). The probability of transitioning from configuration H 916 to configuration D is 9% (a 10% probability of transitioning to configuration B 904 and then a 90% probability of transitioning from configuration B 904 to configuration D 908). The probability of transitioning from configuration H 916 to configuration I 918 may be 2.5% (a 5% probability of transitioning from configuration H 916 to configuration G 914 and a 50% probability of transitioning from configuration G 914 to configuration I 918). Therefore, a mobile computing device in configuration H may have an overall 11.5% (9%+2.5%=11.5%) chance of eventually leading to a malicious configuration.

The network server may send the mobile computing device probability information that may enable the mobile computing device to determine the probability that a pathway configuration will eventually lead to malicious behavior. In another aspect, the mobile computing device may receive the probabilities of transitioning from a pathway configuration to potential future configurations (i.e., the probabilities of directly transitioning from the current configuration to a next configuration) and may locally calculate the probability that a current pathway configuration will eventually lead to malicious behavior.

Figure 10:
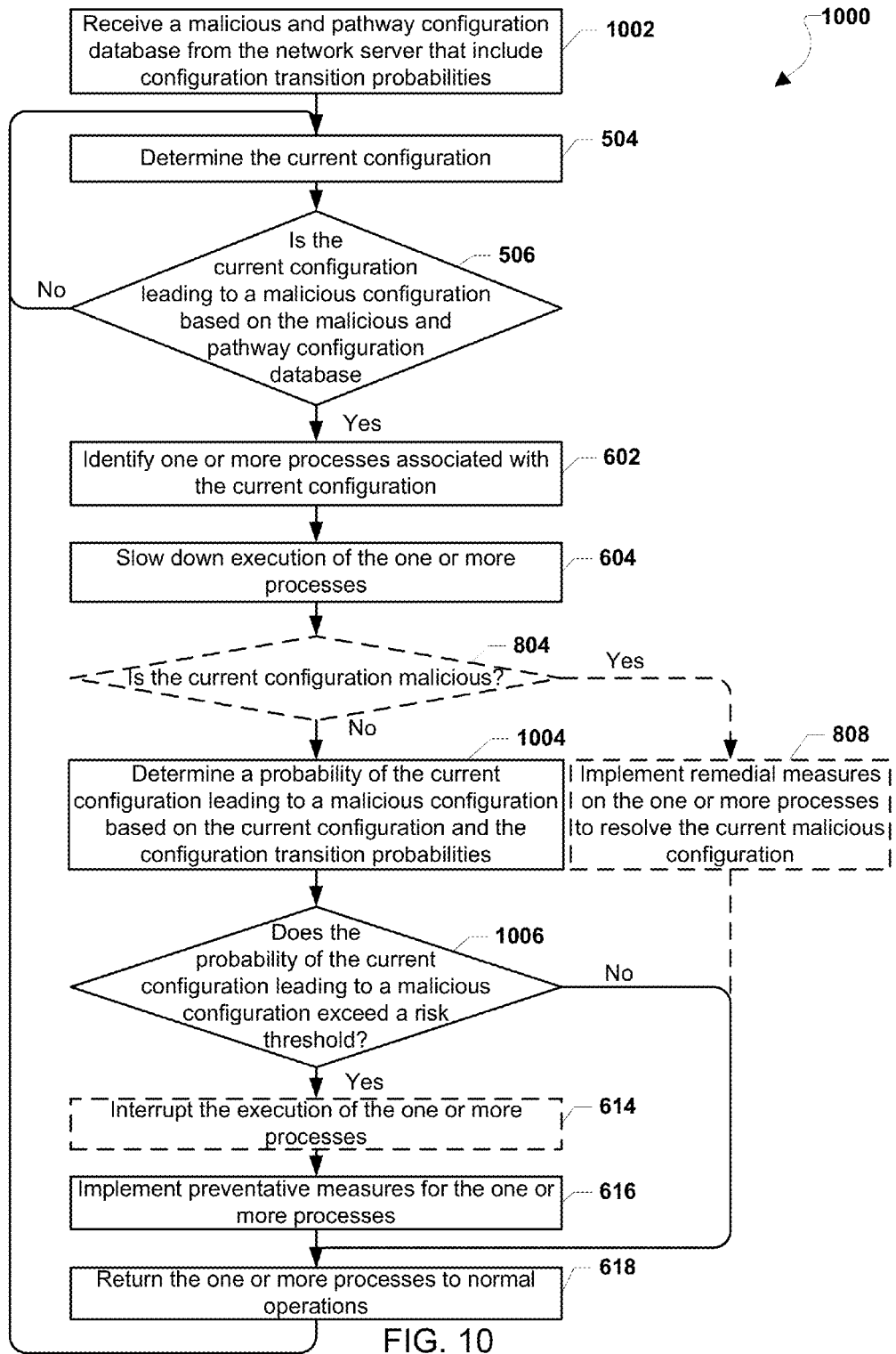
FIG. 10 is a process flow diagram illustrating an aspect method for determining the probability of entering a malicious configuration based on the probability that the current configuration will lead to a malicious configuration.

FIG. 10 illustrates an aspect method 1000 that may be implemented on a mobile computing device for implementing preventative measures to avoid malicious behavior based on the probability of the current configuration leading to a malicious configuration. The operations of method 1000 implement an aspect of the operations of method 500 described above with reference to FIG. 5. In an aspect, after determining that it is currently in a pathway configuration, the mobile computing device may implement preventative measures to avoid malicious behavior when the probability of transitioning to a malicious configuration from the mobile computing device's current configuration exceeds a certain threshold.

In block 1002, the mobile computing device may receive a malicious and pathway configuration database from a network server that includes configuration transition probabilities. As discussed with reference to FIG. 9, the configuration transition probabilities may describe the likelihood that a mobile computing device will transition from one configuration to another configuration, including the probability that a pathway configuration will transition to a malicious configuration. In an aspect, the configuration transition probabilities may describe the probability of transitioning directly from a pathway configuration to a malicious configuration (i.e., the probability of entering a malicious configuration in a single transition). In another aspect, the configuration transition probabilities may indicate the overall probability of eventually transitioning from a pathway configuration to a malicious configuration (i.e., the probability of entering a malicious configuration in one or more transitions).

In block 504, the mobile computing device may determine its current configuration as discussed with reference to block 504 of method 500 described above with reference to FIG. 5. For example, a behavioral analyzer unit may generate a behavioral vector describing the mobile computing device's current configuration based on behavioral observations.

In determination block 506, the mobile computing device may determine whether the current configuration is leading to a malicious configuration based on the malicious and pathway configuration database. In other words, the mobile computing device may determine whether the mobile computing device is a pathway configuration by comparing the mobile computing device's current configuration with a list of pathway configurations included in the malicious and pathway configuration database received from the network server. When the mobile computing device determines that the current configuration is not a pathway configuration (i.e., determination block 506="No"), the process may continue in a loop until the mobile computing device determines that its current configuration is a pathway configuration (i.e., that there is a risk of future malicious behavior).

When the mobile computing device determines that the current configuration is a pathway configuration (i.e., determination block 506="Yes"), the mobile computing device may identify one or more processes associated with the current configuration in block 602. The mobile computing device may also slow down the execution of the one or more processes in block 604. In an aspect, the mobile computing device may identify and slow down the execution of the one or more processes in a manner similar to the ones described above with reference to FIG. 6.

In an optional aspect, the mobile computing device may determine whether the current configuration is malicious in optional determination block 804. For example, by the time the mobile computing device receives a malicious and pathway configuration database from the network server, the mobile computing device's current configuration may already be a malicious configuration. When the mobile computing device determines that the current configuration is malicious (i.e., optional determination block 804="Yes"), the mobile computing device may implement remedial measures on the one or more processes to resolve the current malicious configurations in optional block 808. For example, the mobile computing device may employ convention methods of scanning for and removing malware. The mobile computing device may return the one or more processes to normal operations in block 618. The process may continue in a loop as the mobile computing device may continue recognizing when the mobile computing device enters a pathway configuration starting in block 504.

When the mobile computing device determine that the current configuration is not malicious (i.e., optional determination block 804="No"), the mobile computing device may determine a probability of the current configuration leading to a malicious configuration based on the current configuration and the configuration transition probabilities in block 1004. In an aspect, the mobile computing device may reference the configuration transition probabilities received from the network server and determine the probability that the mobile computing device will directly transition to a malicious configuration from its current configuration.

In another aspect, the mobile computing device may follow transitions from the current configuration to one or more malicious configurations. The mobile computing device may utilize the configuration transition probabilities received from the network server to calculate the probability of the mobile computing device's transition to a malicious configuration from its current configuration after one or more transitions. For example, the mobile computing device may have a 75% chance of transitioning from its current configuration to an intermediate configuration and a 50% chance of transitioning from the intermediate configuration to a malicious configuration. Thus, there may be a 37.5% (75%*50%=37.5%) chance that the current configuration will eventually lead to a malicious configuration.

In determination block 1006, the mobile computing device may determine whether the probability of the current configuration leading to a malicious configuration exceeds a risk threshold. In an aspect, the risk threshold may represent a point at which the costs of implementing preventative measures may exceed the benefits of avoiding malicious behavior. For example, the costs of restoring the one or more processes associated with the current configuration to a previous state or version may not be cost effective when there is only a 5% chance that the current configuration will actually develop into a malicious configuration. The costs of implementing preventative measures may greatly benefit the mobile computing device's overall performance when there is a 95% chance that the current configuration will lead to malicious behavior. As mentioned above with reference to FIG. 5, the risk threshold may be set based on a user input received from a user interface device, thereby enabling the user to specify a desired level of security.

When the mobile computing device determines that the probability of the current configuration leading to a malicious configuration does not exceed the risk threshold (i.e., determination block 1006="No"), the mobile computing device may return the one or more processes to normal operations in block 618 as described above with reference to FIG. 6. The process may continue in a loop as the mobile device may continue by determining the current configuration in block 504.

When the mobile computing device determines that the probability of the current configuration leading to a malicious configuration exceeds the risk threshold (i.e., determination block 1006="Yes"), the mobile computing device may optionally interrupt the execution of the one or more processes in optional block 614. The mobile computing device may also implement preventative measures for the one or more processes in block 616 as described above with reference to FIG. 6. The mobile computing device may also return the one or more processes to normal operations in block 618.

The process may continue in a loop as the mobile computing device may continue recognizing when the mobile computing device enters a pathway configuration starting in block 504.

Figure 11:
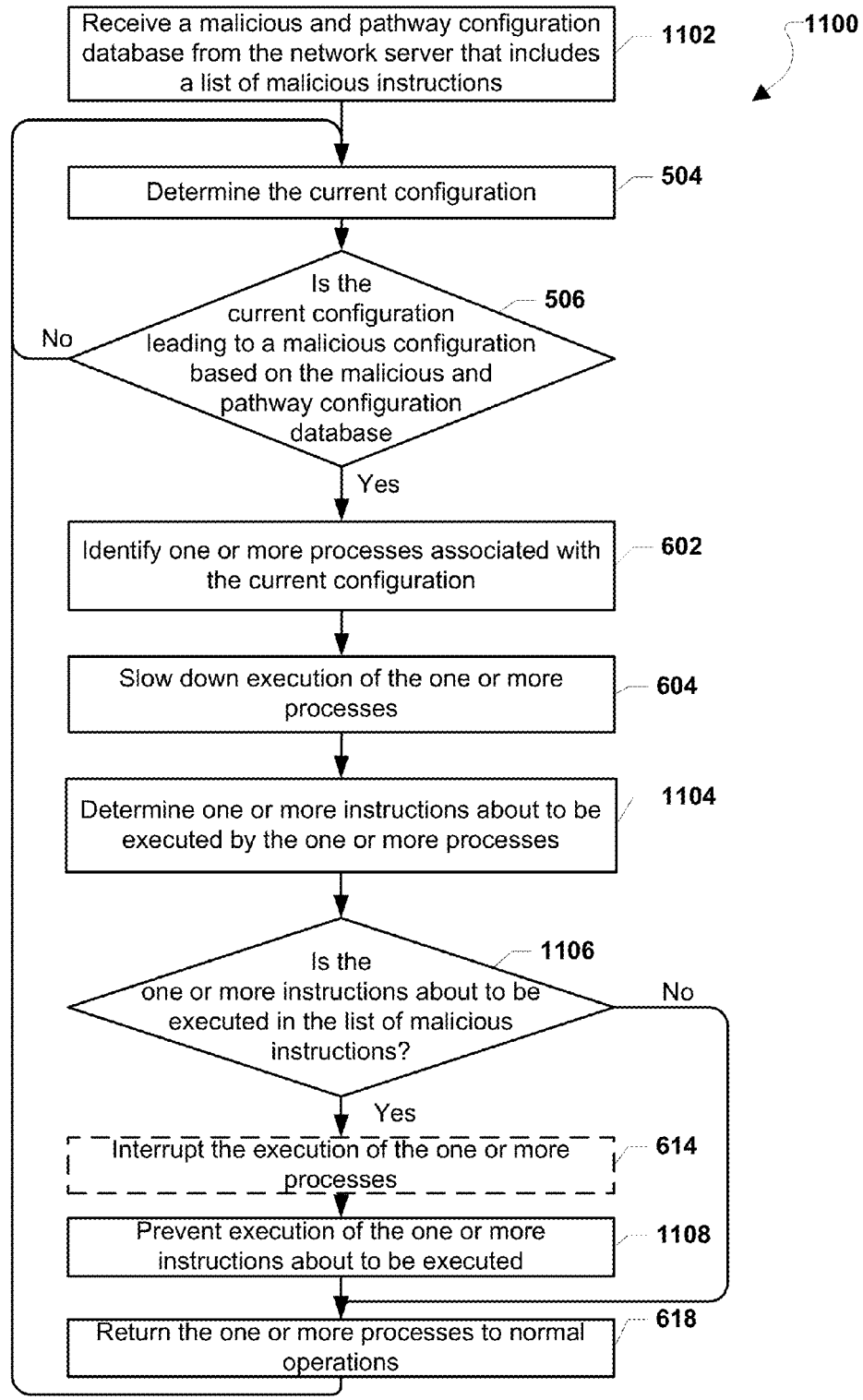
FIG. 11 is a process flow diagram illustrating an aspect method for implementing preventative measures in response to determining that there is a substantial likelihood of malicious behavior in the near future based on instructions about to be performed.

FIG. 11 illustrates an aspect method 1100 that may be implemented on a mobile computing device for preventing the execution of instructions determined to cause malicious behavior. The operations of method 1100 implement an aspect of the operations of method 500 described above with reference to FIG. 5.

In block 1102, the mobile computing device may receive a malicious and pathway configuration database from a network server that includes a list of malicious pathway instructions. As described above with reference to optional block 414 in FIG. 4, the network server may compile a list of instructions associated with causing malicious behavior from the configuration information and configuration histories received from multiple mobile devices. For example, mobile computing device may report both their configurations at the point in which they discovered malicious behavior as well as a list of the instructions the mobile computing devices performed leading up to the malicious behavior. Thus, in an aspect, the network server may generate a malicious and pathway configuration database that includes these potentially malicious pathway instructions, thereby enabling a mobile computing device to monitor for and prevent the execution of these instructions as described below.

In block 504, the mobile computing device may determine the current configuration as discussed with reference to block 504 of method 500 described above with reference to FIG. 5. For example, a behavioral analyzer unit may generate a behavioral vector describing the mobile computing device's current configuration based on behavioral observations.

In determination block 506, the mobile computing device may determine whether the current configuration is leading to a malicious configuration based on the malicious and pathway configuration database. In other words, the mobile computing device may determine whether the mobile computing device is a pathway configuration by comparing the mobile computing device's current configuration with a list of pathway configurations included in the malicious and pathway configuration database received from the network server. When the mobile computing device determines that the current configuration is not a pathway configuration (i.e., determination block 506="No"), the process may continue in a loop until the mobile computing device determines that its current configuration is a pathway configuration (i.e., that there is a risk of future malicious behavior).

When the mobile computing device determines that the current configuration is a pathway configuration (i.e., determination block 506="Yes"), the mobile computing device may identify one or more processes associated with the current configuration in block 602. The mobile computing device may also slow down the execution of the one or more processes in block 604. In an aspect, the mobile computing device may identify and slow down the execution of the one or more processes in a manner similar to the ones described above with reference to FIG. 6.

In block 1104, the mobile computing device may determine one or more instructions about to be executed by the one or more processes. In an aspect, the mobile computing device may preview the instructions the one or more processes are about to execute and may compare those instructions with the list of malicious pathway instructions included in the malicious and pathway configuration database received from the network server.

In determination block 1106, the mobile computing device may determine whether the one or more instruction about to be executed are in the list of malicious pathway instructions. For example, the mobile computing device may discover the names of function calls that the one or more processes are about to invoke, and the mobile computing device check the malicious and pathway configuration database to determine whether those function call names are included in the list of malicious pathway instructions.

When the mobile computing device determines that the one or more instructions about to be executed are not in the list of malicious pathway instructions (i.e., determination block 1106="No"), the mobile computing device may return the one or more processes to normal operations in block 618 as described above with reference to FIG. 6. The process may continue in a loop as the mobile computing device may continue by determining the current configuration in block 504.

When the mobile computing device determines that the one or more instructions about to be executed are in the list of malicious pathway instructions (i.e., determination block 1106="Yes"), the mobile computing device may optionally interrupt the execution of the one or more processes in optional block 614.

In block 1108, the mobile computing device may prevent the execution of the one or more instructions about to be executed. In an aspect, the mobile computing device may reset/restart the one or more processes or revert the one or more processes to an earlier, benign configuration. In another aspect, the mobile computing device may only prevent the one or more processes from executing the one or more instructions determined to be malicious, and the mobile computing device may otherwise allow the one or more processes to operate normally in block 618.

The mobile computing device may execute the aspect process in a continuous loop returning to block 504 so that the mobile computing device continuously monitors whether it has entered a pathway configuration.

Figure 12:
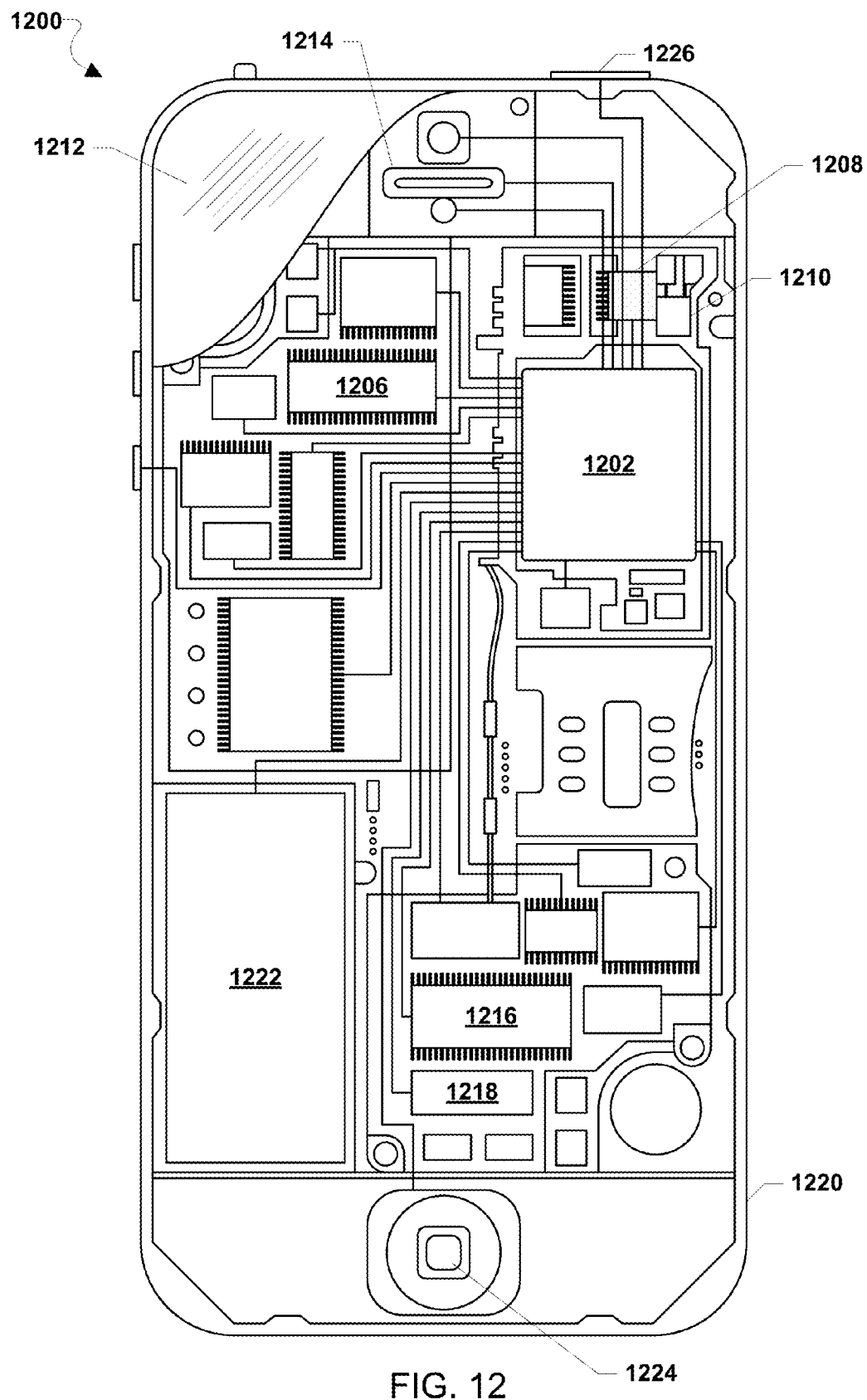
FIG. 12 is a component block diagram of a mobile computing device suitable for use in an aspect.

The various aspects may be implemented in any of a variety of mobile computing devices, an example of which is illustrated in FIG. 12. The mobile computing device 1200 may include a processor 1202 coupled to an internal memory 1206. The processor 1202 may be one or more multicore integrated circuits designated for general or specific processing tasks. The internal memory 1206 may be volatile or non-volatile memory, and may also be secure and/or encrypted memory, or unsecure and/or unencrypted memory, or any combination thereof. The processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have one or more radio signal transceivers 1208 (e.g., Peanut®, Bluetooth®, Zigbee®, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as USB, FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components discussed herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
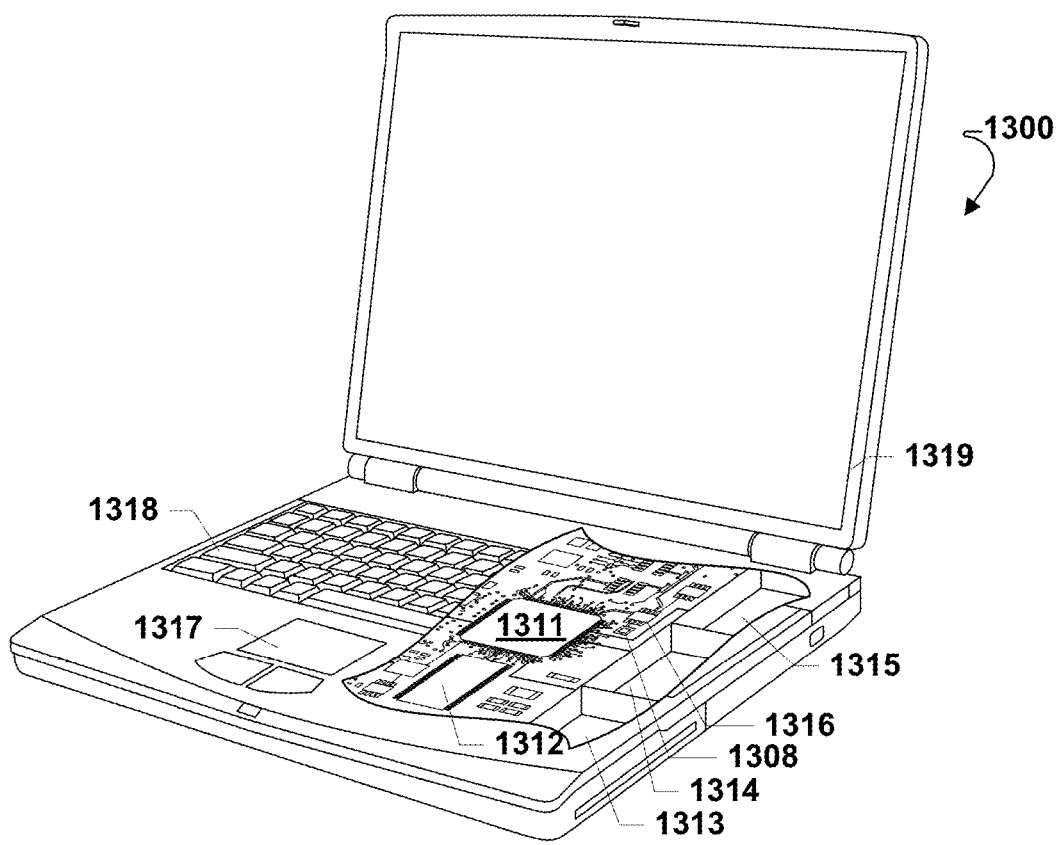
FIG. 13 is a component block diagram of another mobile computing device suitable for use in an aspect.

The various aspects described above may also be implemented within a variety of mobile computing devices, such as a laptop computer 1300 illustrated in FIG. 13. Many laptop computers include a touchpad touch surface 1317 that serves as the computer's pointing device, and thus may receive drag, scroll, and flick gestures similar to those implemented on mobile computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be use in conjunction with the various aspects.

Figure 14:
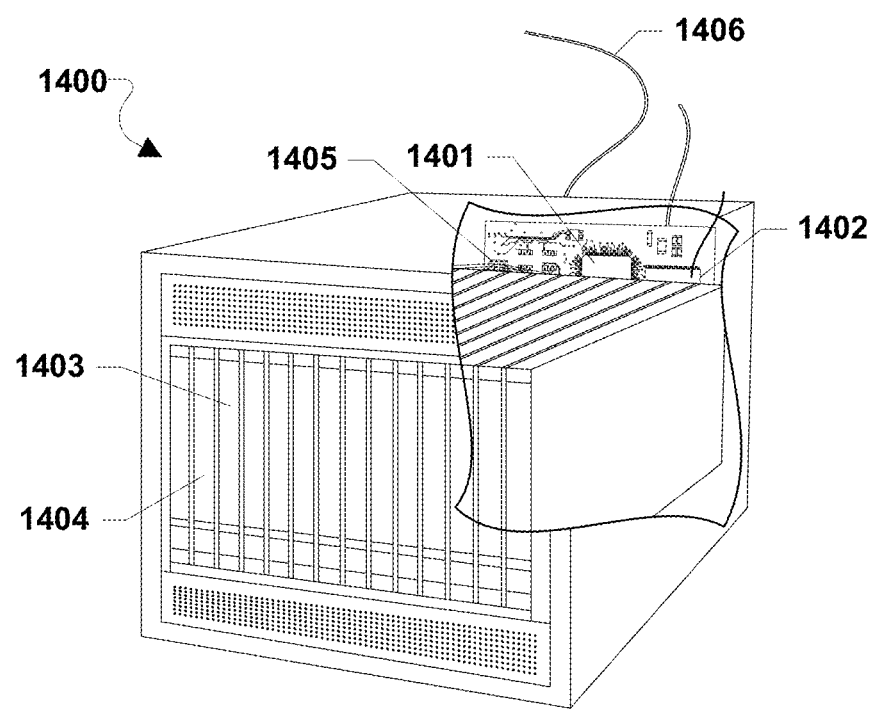
FIG. 14 is a component block diagram of a network server device suitable for use in an aspect.

Portions of the aspect methods may be accomplished in a client-server architecture with some of the processing occurring in a server, such as maintaining databases of normal operational behaviors, which may be accessed by a mobile computing device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers. The processor 1401 may be any programmable microprocessor, microcomputer or multiple processor chip or chips that can be configured by software instructions (applications) to perform a variety of functions, including the functions of the various aspects described above. Typically, software applications may be stored in the internal memory 1402, 1403 before they are accessed and loaded into the processor 1401. The processor 1401 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of predicting probable malicious behavior on a mobile computing device, comprising:
   receiving, via a processor of the mobile computing device, a pathway configuration database from a server computing device, wherein the received pathway configuration database includes information identifying:
      a configuration pattern;
      a pathway between configurations that lead to a non-benign configuration; and
      a probability value that identifies the possibility that the pathway will lead to a non-benign behavior;
   determining, via the processor, operations scheduled for execution on the mobile computing device;
   determining, via the processor, a probability that execution of scheduled operations will result in the non-benign behavior in the mobile computing device based on the information included in the received pathway configuration database;
   and
   implementing preventative measures in response to determining that the probability that the execution of scheduled operations will result in the non-benign behavior exceeds a threshold value.

2. The method of claim 1, wherein implementing the preventative measures comprises:

identifying a process associated with the operations scheduled for execution on the mobile computing device; and slowing down execution of the process.

3. The method of claim 2, further comprising:

examining other behaviors occurring on the mobile computing device;

determining a current configuration of the mobile computing device;

determining whether there is a substantial likelihood that the current configuration will result in the non-benign behavior based on examining the other behaviors; and implementing the preventative measures for the process in response to determining that there is a substantial likelihood that the current configuration will result in the non-benign behavior based on examining the other behaviors.

4. The method of claim 2, further comprising:

determining a classification of a current configuration of the mobile computing device;

determining a classification of a potential future configuration of the mobile computing device;

determining a likelihood of the current configuration causing the non-benign behavior based on the classification of the current configuration and the classification of the potential future configuration;

determining whether the likelihood is substantial; and implementing the preventative measures for the process in response to determining that the likelihood is substantial.

5. The method of claim 2, further comprising:

determining a current configuration of the mobile computing device;

determining a probability of the current configuration causing the non-benign behavior based on the current configuration and the probability value included in the received pathway configuration database;

determining whether the probability of the current configuration leading to the non-benign behavior exceeds a risk threshold; and implementing the preventative measures for the process in response to determining that the probability of the current configuration causing the non-benign behavior exceeds the risk threshold.

6. A mobile computing device, comprising:

a memory;

a transceiver; and a processor coupled to the memory and the transceiver, wherein the processor is configured with processor-executable instructions to perform operations comprising:

receiving a pathway configuration database from a server computing device, wherein the received pathway configuration database includes information identifying:

a configuration pattern, a pathway between configurations that lead to a non-benign configuration, and a probability value that identifies the possibility that the pathway will lead to a non-benign behavior;

determining operations scheduled for execution on the mobile computing device;

determining a probability that execution of scheduled operations will result in the non-benign behavior in the mobile computing device based on the information included in the received pathway configuration database;

and implementing preventative measures in response to determining that the probability that the execution of scheduled operations will result in the non-benign behavior exceeds a threshold value.

7. The mobile computing device of claim 6, wherein the processor is configured with processor-executable instructions to perform operations such that implementing the preventative measures comprises:

identifying a process associated with the operations scheduled for execution on the mobile computing device; and slowing down execution of the process.

8. The mobile computing device of claim 7, wherein the processor is configured with processor-executable instructions to perform operations further comprising:

examining other behaviors occurring on the mobile computing device;

determining a current configuration of the mobile computing device;

determining whether there is a substantial likelihood that the current configuration will result in the non-benign behavior based on examining the other behaviors; and implementing the preventative measures for the process in response to determining that there is a substantial likelihood that the current configuration will result in the non-benign behavior based on examining the other behaviors.

9. The mobile computing device of claim 7, wherein the processor is configured with processor-executable instructions to perform operations further comprising:

determining a classification of a current configuration of the mobile computing device;

determining a classification of a potential future configuration of the mobile computing device;

determining a likelihood of the current configuration causing the non-benign behavior based on the classification of the current configuration and the classification of the potential future configuration;

determining whether the likelihood is substantial; and implementing the preventative measures for the process in response to determining that the likelihood is substantial.

10. The mobile computing device of claim 7, wherein the processor is configured with processor-executable instructions to perform operations further comprising:

determining a current configuration of the mobile computing device;

determining a probability of the current configuration causing the non-benign behavior based on the current configuration and the probability value included in the received pathway configuration database;

determining whether the probability of the execution of scheduled operations causing the non-benign behavior exceeds a risk threshold; and implementing the preventative measures for the process in response to determining that the probability of the current configuration causing the non-benign behavior exceeds the risk threshold.

11. A mobile computing device, comprising:

means for receiving a pathway configuration database from a server computing device, wherein the received pathway configuration database includes information identifying:

a configuration pattern;

a pathway between configurations that lead to a non-benign configuration; and a probability value that identifies the possibility that the pathway will lead to a non-benign behavior;

means for determining operations scheduled for execution on the mobile computing device;

means for determining a probability that execution of scheduled operations will result in the non-benign behavior in the mobile computing device based on the information included in the received pathway configuration database; and means for implementing preventative measures in response to determining that the probability that the execution of scheduled operations will result in the non-benign behavior exceeds a threshold value.

12. The mobile computing device of claim 11, wherein means for implementing preventative measures comprises:

means for identifying a process associated with a current configuration; and means for slowing down execution of the process.

13. The mobile computing device of claim 12, further comprising:

means for examining other behaviors occurring on the mobile computing device;

means for determining whether there is a substantial likelihood that the current configuration will result in the non-benign behavior based on examination of the other behaviors; and means for implementing preventative measures for the process in response to determining that there is a substantial likelihood that the current configuration will result in the non-benign behavior based on examining the other behaviors.

14. The mobile computing device of claim 12, further comprising:

means for determining a classification of the current configuration;

means for determining a classification of a potential future configuration;

means for determining a likelihood of the current configuration causing the non-benign behavior based on the classification of the current configuration and the classification of the potential future configuration;

means for determining whether the likelihood is substantial; and means for implementing preventative measures for the process in response to determining that the likelihood is substantial.

15. The mobile computing device of claim 12, further comprising:

means for determining a probability of the current configuration leading to a malicious configuration based on the current configuration and the probability value included in the received pathway configuration database;

means for determining whether the probability of the current configuration leading to the malicious configuration exceeds a risk threshold; and means for implementing preventative measures for the process in response to determining that the probability of the current configuration leading to the malicious configuration exceeds the risk threshold.

16. A non-transitory processor-readable storage medium having stored thereon processor-executable instructions configured to cause a mobile computing device processor of a mobile computing device to perform operations comprising:

receiving a pathway configuration database from a server computing device, wherein the received pathway configuration database includes information identifying:

a configuration pattern;

a pathway between configurations that lead to a non-benign configuration; and a probability value that identifies the possibility that the pathway will lead to a non-benign behavior;

determining a probability that execution of scheduled operations will result in the non-benign behavior in the mobile computing device based on the information included in the received pathway configuration database; and implementing preventative measures in response to determining that the probability that the execution of scheduled operations will result in the non-benign behavior exceeds a threshold value.

17. The non-transitory processor-readable storage medium of claim 16, wherein the stored processor-executable instructions are configured to cause a mobile computing device processor to perform operations such that implementing the preventative measures comprises:

identifying a process associated with the operations scheduled for execution on the mobile computing device; and slowing down execution of the process.

18. The non-transitory processor-readable storage medium of claim 17, wherein the stored processor-executable instructions are configured to cause a mobile computing device processor to perform operations further comprising:

examining other behaviors occurring on the mobile computing device;

determining a current configuration of the mobile computing device;

determining whether there is a substantial likelihood that the current configuration will result in the non-benign behavior based on examining the other behaviors; and implementing the preventative measures for the process in response to determining that there is a substantial likelihood that the current configuration will result in the non-benign behavior based on examining the other behaviors.

19. The non-transitory processor-readable storage medium of claim 17, wherein the stored processor-executable instructions are configured to cause a mobile computing device processor to perform operations further comprising:

determining a classification of a current configuration of the mobile computing device;

determining a classification of a potential future configuration of the mobile computing device;

determining a likelihood of the current configuration causing the non-benign behavior based on the classification of the current configuration and the classification of the potential future configuration;

determining whether the likelihood is substantial; and implementing the preventative measures for the process in response to determining that the likelihood is substantial.

20. The non-transitory processor-readable storage medium of claim 17, wherein the stored processor-executable instructions are configured to cause a mobile computing device processor to perform operations further comprising:

determining a current configuration of the mobile computing device;

determining a probability of the current configuration causing the non-benign behavior based on the current configuration and the probability value included in the received pathway configuration database;

determining whether the probability of the current configuration causing the non-benign behavior exceeds a risk threshold; and implementing the preventative measures for the process in response to determining that the probability of the current configuration causing the non-benign behavior exceeds the risk threshold.

* * * * *